(12) United States Patent
Kanagarathinam et al.

(10) Patent No.: US 10,523,794 B2
(45) Date of Patent: Dec. 31, 2019

(54) METHOD AND APPARATUS FOR MANAGING MULTIPATH TRANSMISSION CONTROL PROTOCOL

(71) Applicant: Samsung Electronics Co., Ltd., Gyeonggi-do (KR)

(72) Inventors: Madhan Raj Kanagarathinam, Bangalore (IN); Kartik Swaminathan Iyer, Bangalore (IN); Kyoung-Jin Moon, Yongin-si (KR); Dronamraju Siva Sabareesh, Bangalore (IN); Jae-Won Jang, Suwon-si (KR); Jae-Kwang Han, Suwon-si (KR); Ranjith Kumar, Bangalore (IN); Sunil Kumar Venkata B, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 41 days.

(21) Appl. No.: 15/600,531

(22) Filed: May 19, 2017

(65) Prior Publication Data

US 2017/0339257 A1    Nov. 23, 2017

(30) Foreign Application Priority Data

May 19, 2016   (IN) .............................. 201641017295
Dec. 16, 2016  (IN) .............................. 201641017295

(51) Int. Cl.
*H04L 29/08* (2006.01)
*H04L 29/06* (2006.01)
(Continued)

(52) U.S. Cl.
CPC .......... *H04L 69/163* (2013.01); *H04L 45/124* (2013.01); *H04L 45/24* (2013.01);
(Continued)

(58) Field of Classification Search
None
See application file for complete search history.

(56) References Cited

U.S. PATENT DOCUMENTS 9,264,353 B2    2/2016  Krishnaswamy et al.
2010/0035603 A1  2/2010  Saijonmaa et al.
(Continued)

OTHER PUBLICATIONS

ISA/KR, "International Search Report," Application No. PCT/KR2017/005235, dated Aug. 7, 2017, 3 pages.
(Continued)

*Primary Examiner* — Sithu Ko

(57) ABSTRACT

Methods and systems for managing a Multipath Transmission Control Protocol (MPTCP) in an electronic device during data transport between the electronic device (client device) and other electronic device (host device) are described. The method includes monitoring one or more factors associated with the MPTCP implemented in the client device. Further, based on the one or more factors that are monitored, the method includes determining whether to enable the MPTCP in the electronic device for a current data transport. Thereafter, the method includes determining a mode, among a plurality of modes provided for the MPTCP, to control a plurality of subflows of the MPTCP when the MPTCP is enabled for the current data transport. The method further includes dynamically switching the mode of the MPTCP during the current data transport based on the one or more factors being monitored during the current data transport.

18 Claims, 24 Drawing Sheets

(51) Int. Cl.
*H04L 12/721* (2013.01)
*H04W 80/06* (2009.01)
*H04L 12/707* (2013.01)
*H04L 29/12* (2006.01)
*H04W 8/26* (2009.01)
*H04W 40/02* (2009.01)
*H04W 88/10* (2009.01)
*H04L 12/801* (2013.01)
*H04L 12/851* (2013.01)
*H04W 76/16* (2018.01)
*H04W 76/15* (2018.01)

(52) U.S. Cl.
CPC ........... *H04W 80/06* (2013.01); *H04L 47/193* (2013.01); *H04L 47/24* (2013.01); *H04L 61/6063* (2013.01); *H04L 69/14* (2013.01); *H04L 69/161* (2013.01); *H04W 8/26* (2013.01); *H04W 40/02* (2013.01); *H04W 76/15* (2018.02); *H04W 76/16* (2018.02); *H04W 88/10* (2013.01)

(56) References Cited

U.S. PATENT DOCUMENTS

| | | | |
|---|---|---|---|
| 2011/0170405 A1 | 7/2011 | Beercroft et al. | |
| 2012/0102098 A1* | 4/2012 | Guillou | G06F 9/5083 709/203 |
| 2013/0064198 A1* | 3/2013 | Krishnaswamy | H04L 45/24 370/329 |
| 2013/0279331 A1 | 10/2013 | Pluntke et al. | |
| 2014/0089506 A1* | 3/2014 | Puttaswamy Naga | H04L 45/42 709/225 |
| 2014/0351447 A1* | 11/2014 | Annamalaisami | H04L 65/1069 709/227 |
| 2015/0103663 A1 | 4/2015 | Amini et al. | |
| 2015/0215225 A1 | 7/2015 | Mildh et al. | |
| 2015/0237525 A1* | 8/2015 | Mildh | H04W 28/0215 370/230.1 |
| 2016/0116966 A1* | 4/2016 | Gao | G06F 1/3203 718/1 |
| 2016/0309534 A1* | 10/2016 | Teyeb | H04L 69/14 |
| 2016/0373339 A1* | 12/2016 | Teyeb | H04L 45/24 |
| 2017/0134261 A1* | 5/2017 | Seo | H04L 12/66 |
| 2018/0254979 A1* | 9/2018 | Scahill | H04L 45/24 |

OTHER PUBLICATIONS

ISA/KR, "Written Opinion of the International Searching Authority," Application No. PCT/KR2017/005235, dated Aug. 7, 2017, 8 pages.

Yeon-sup Lim et al., "Design, Implementation, and Evaluation of Energy-Aware Multi-Path TCP", CoNEXT'15, Dec. 1-4, 2015, 13 pages.

M. Scharf et al., "MPTCP Application Interface Considerations", draft-ietf-mptcp-api-07, Internet Engineering Task Force, Jan. 19, 2013, 34 pages.

Supplementary European Search Report dated Jan. 28, 2019 in connection with European Patent Application No. 17 79 9699, 8 pages.

* cited by examiner

METHOD AND APPARATUS FOR MANAGING MULTIPATH TRANSMISSION CONTROL PROTOCOL

CROSS-REFERENCE TO RELATED APPLICATION(S) AND CLAIM OF PRIORITY

The present application is related to and is based on and claims priority under 35 U.S.C. § 119 to an Indian Patent Provisional Application No. 201641017295 filed on May 19, 2016 and an Indian Patent Complete Application No. 201641017295, filed on Dec. 16, 2016, the disclosures of which are incorporated by reference in its entirety.

TECHNICAL FIELD

The present disclosure relates to a method and apparatus for managing a multipath transmission control protocol (MPTCP) in wireless communication.

BACKGROUND

To meet the demand for wireless data traffic, which has increased since deployment of 4th-generation (4G) communication systems, efforts have been made to develop an improved 5th-generation (5G) or pre-5G communication system. Therefore, the 5G or pre-5G communication system is also called a 'beyond 4G network' or a 'post long-term evolution (LTE) system'.

It is considered that the 5G communication system will be implemented in millimeter wave (mmWave) bands, e.g., 60 GHz bands, so as to accomplish higher data rates. To reduce propagation loss of radio waves and increase a transmission distance, a beam forming technique, a massive multiple-input multiple-output (MIMO) technique, a full dimensional MIMO (FD-MIMO) technique, an array antenna technique, an analog beam forming technique, and a large scale antenna technique are discussed in 5G communication systems.

In addition, in 5G communication systems, development for system network improvement is under way based on advanced small cells, cloud radio access networks (RANs), ultra-dense networks, a device-to-device (D2D) communication, a wireless backhaul, a moving network, a cooperative communication, coordinated multi-points (CoMP), reception-end interference cancellation, and the like.

In the 5G system, a hybrid frequency shift keying (FSK) and quadrature amplitude modulation (QAM) modulation (FQAM) and a sliding window superposition coding (SWSC) as an advanced coding modulation (ACM) scheme, and a filter bank multi carrier (FBMC) scheme, a non-orthogonal multiple access (NOMA) scheme, and a sparse code multiple access (SCMA) scheme as an advanced access technology have been developed.

A multipath transmission control protocol (MPTCP) provides a set of extensions to regular transmission control protocol (TCP) that enables a single data flow to be separated and carried across multiple connections in contrary to a TCP where, communication for data transport is restricted to a single network path. For example, the MPTCP enables downloading a video stream on a mobile phone from the Internet server using wireless fidelity (Wi-Fi) capability and long term evolution (LTE) connectivity enabled at the mobile device end. The data of the single video stream is separated as two subflows over Wi-Fi and the LTE. Thus, an MPTCP enhances the user experience by providing higher throughput and improved resilience against network failures.

An existing MPTCP broadly operates in two modes. A full-MPTCP mode, wherein data transmission is enabled on all available network interfaces at any time by creating subflow for each interface. Further, an MPTCP backup mode, wherein transmission of data on the interface with back up mode enabled is performed only if other interfaces are down. Further, whichever mode is utilized, MPTCP creates subflows for data traffic on all interfaces, however a scheduler utilizes one or more of these subflows based on the need of the data to be transmitted. The subflows are created by a path manger, generally two path managers such as a full-mesh path manager and Ndiffports path manager. The full-mesh path manager creates a subflow from each address owned by the client device to each address advertised by the host device. These subflows are created at the beginning of the connection when the initial subflow has been validated. The Ndiffports path manager provides the MPTCP connection composed of n subflows that use different source ports. Based on the way subflows are created the MPTCP connection is said to operate in various modes such as Mode 1, Mode 2 and the like. These modes are preset, with generally weightage for data speed. Further, once set, the mode is static. The electronic devices participating in the MPTCP follow the pre-set mode irrespective of whether existing selected mode is appropriate/inappropriate for current data transport being carried out. Currently, electronic devices transporting data in accordance with the MPTCP, (functioning as the host device or the client device) have a plurality of communication interfaces available such as 3G, 4G, LTE, Wi-Fi, Bluetooth, near field communication (NFC) and so on. However for these electronic devices, such as mobile phones, smart phones, wearable computing devices, computers, and tablets and so on, power consumption is equally important along with the data throughput. In such scenarios a static mode may not provide overall optimized performance, effectively degrading user experience. Consequently, MPTCP mainly designed for wired network, does not consider factors like power and data consumption. When multiple interface of MPTCP is enabled the power is drained exponentially. The user might waste data for on LTE which he wouldn't prefer.

The above information is presented as background information only to assist with an understanding of the present disclosure. No determination has been made, and no assertion is made, as to whether any of the above might be applicable as prior art with regard to the present disclosure.

SUMMARY

To address the above-discussed deficiencies, it is a primary object to provide methods and systems to manage a multipath transmission control protocol (MPTCP) in an electronic device (client device) by dynamically controlling an interface mode of the MPTCP for a current data transport between the client device and another electronic device (host device), wherein the interface mode is selected from the plurality of interface modes of the MPTCP based on one or more factors associated with the MPTCP implemented in the electronic device.

Another aspect of the present disclosure is to dynamically select the interface mode for data transport using the MPTCP so as to provide decreasing power consumption and decreasing/increasing data consumption.

Another aspect of the present disclosure is to provide methods and systems for providing the plurality of interface modes, wherein the plurality of interface modes comprise additional interface modes that enable opening multiple ports for subflows of the MPTCP for one or more communication interfaces among a plurality of communication interfaces available on the client device and the host device to provide improved throughput.

In view of the foregoing, an embodiment herein provides a method for managing a multipath transmission control protocol (MPTCP) in an electronic device. The method comprises monitoring at least one factor associated with the MPTCP implemented in the electronic device. Further, the method comprises enabling the MPTCP in the electronic device for a current data transport based on the at least one factor, wherein the data transport for the MPTCP is carried out through at least one communication interface on the electronic device. Further, the method comprises determining an interface mode, among a plurality of interface modes provided for the MPTCP, to control a plurality of subflows of the MPTCP when the MPTCP is enabled for the current data transport, wherein the plurality of subflows are controlled based on the at least one factor monitored for the MPTCP. Furthermore, the method comprises switching the interface mode during the current data transport based on the at least one factor being monitored during the current data transport.

Embodiments further disclose a method for managing a multipath transmission control protocol (MPTCP) in a first electronic device communicating with a second electronic device, wherein the first electronic device includes first communication interfaces and the second electronic device includes second communication interfaces. The method comprises monitoring factors associated with the MPTCP and enabling the MPTCP. Further, the method comprises determining an interface mode, among a plurality of interface modes, to control a plurality of subflows of the MPTCP based on the factors. Furthermore, the method comprises switching from the interface mode to another interface mode during a current data transport based on the factors.

Embodiments further disclose an electronic device for managing a multipath transmission control protocol (MPTCP) in the electronic device, wherein the electronic device comprises an MPTCP optimizer unit (an MPTCP controller) configured to monitor at least one factor associated with the MPTCP implemented in the electronic device. Further, the MPTCP optimizer unit is configured to enable the MPTCP in the electronic device for a current data transport based on the at least one factor, wherein the data transport for the MPTCP is carried out through at least one communication interface on the electronic device. Further, the MPTCP optimizer unit is configured to determine an interface mode, among a plurality of interface modes provided for the MPTCP, to control a plurality of subflows of the MPTCP when the MPTCP is enabled for the current data transport, wherein the plurality of subflows are controlled based on the at least one factor monitored for the MPTCP. Furthermore, the MPTCP optimizer unit is configured to switch the interface mode during the current data transport based on the at least one factor being monitored during the current data transport. The term MPTCP optimizer unit may be interchangeable with the term MPTCP controller.

Embodiments further disclose a first electronic device for managing a multipath transmission control protocol (MPTCP) in the first electronic device communicating with a second electronic device, wherein the first electronic device comprises first communication interfaces and the second electronic device comprises second communication interfaces, wherein the first electronic device further comprises an MPTCP controller configured to monitor factors associated with the MPTCP and to enable the MPTCP. Further the MPTCP controller is configured to determine an interface mode, among a plurality of interface modes, to control a plurality of subflows of the MPTCP based on the factors. Furthermore, the MPTCP controller is configured to switch from the interface mode to another interface mode during the current data transport based on the factors.

These and other aspects of the present disclosure will be better appreciated and understood when considered in conjunction with the following description and the accompanying drawings. It should be understood, however, that the following descriptions, while indicating embodiments and numerous specific details thereof, are given by way of illustration and not of limitation. Many changes and modifications may be made within the scope of the embodiments herein without departing from the spirit thereof, and the embodiments herein include all such modifications.

According to this disclosure, the method and apparatus for managing MPTCP allow user to control MPTCP based on user interest and provide better power and data management, including effective data saving, reduced data consumption and avoiding data creation on LTE. Regarding to increased battery performance, we achieved test results of average 24% power gain during idle time, caused by reduced signaling and multi-socket creation.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
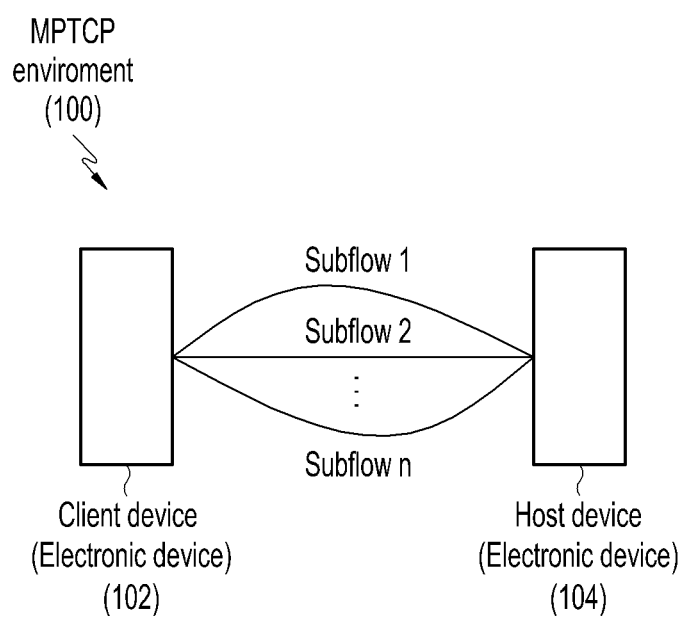
FIG. 1 illustrates an example Multipath Transmission Control Protocol (MPTCP) environment for managing MPTCP-based data transport between electronic device (host device and client device), according to embodiments of the present disclosure.

FIGS. 1 through 19, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although ordinal numbers such as "first," "second," and so forth will be used to describe various components, those components are not limited herein. The terms are used only for distinguishing one component from another component. For example, a first component may be referred to as a second component and likewise, a second component may also be referred to as a first component, without departing from the teaching of the inventive concept. The term "and/or" used herein includes any and all combinations of one or more of the associated listed items.

The terminology used herein is for the purpose of describing various embodiments only and is not intended to be limiting. As used herein, the singular forms are intended to include the plural forms as well, unless the context clearly indicates otherwise. It will be further understood that the terms "comprises" and/or "has," when used in this specification, specify the presence of a stated feature, number, step, operation, component, element, or combination thereof, but do not preclude the presence or addition of one or more other features, numbers, steps, operations, components, elements, or combinations thereof.

The terms used herein, including technical and scientific terms, have the same meanings as terms that are generally understood by those skilled in the art, as long as the terms are not differently defined. It should be understood that terms defined in a generally-used dictionary have meanings coinciding with those of terms in the related technology.

According to various embodiments of the present disclosure, an electronic device may include communication functionality. For example, an electronic device may be a smart phone, a tablet personal computer (PC), a mobile phone, a video phone, an e-book reader, a desktop PC, a laptop PC, a netbook PC, a personal digital assistant (PDA), a portable multimedia player (PMP), an mp3 player, a mobile medical device, a camera, a wearable device (e.g., a head-mounted device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television, a digital video disk (DVD) player, an audio, a refrigerator, an air conditioner, a vacuum cleaner, an oven, a microwave oven, a washer, a dryer, an air purifier, a set-top box, a TV box (e.g., SAMSUNG HOMESYNC™, APPLE TV®, or GOOGLE TV®), a gaming console, an electronic dictionary, an electronic key, a camcorder, an electronic picture frame, and/or the like.

According to various embodiments of the present disclosure, an electronic device may be a medical device (e.g., magnetic resonance angiography (MRA) device, a magnetic resonance imaging (MRI) device, computed tomography (CT) device, an imaging device, or an ultrasonic device), a navigation device, a global positioning system (GPS) receiver, an event data recorder (EDR), a flight data recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

A method and apparatus proposed in an embodiment of the present disclosure may be applied to various communication systems such as a digital video broadcasting system such as a mobile broadcasting service such as a digital multimedia broadcasting (DMB) service, a digital video broadcasting-handheld (DVP-H) service, an advanced television systems committee-mobile/handheld (ATSC-M/H) service, and the like, and an internet protocol television (IPTV) service, a moving picture experts group (MPEG) media transport (MMT) system, an evolved packet system (EPS), a long term evolution (LTE) mobile communication system, an LTE-advanced (LTE-A) mobile communication system, a high speed downlink packet access (HSDPA) mobile communication system, a high speed uplink packet access (HSDPA) mobile communication system, a high rate packet data (HRPD) mobile communication system proposed in a 3rd generation partnership project 2 (3GPP2), a wideband code division multiple access (WCDMA) mobile communication system proposed in the 3GPP2, a code division multiple access (CDMA) mobile communication system proposed in the 3GPP2, an institute of electrical and electronics engineers (IEEE) mobile communication system, a mobile internet protocol (Mobile IP) system, and/or the like.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein achieve methods and systems for managing a multipath transmission control protocol (MPTCP) in an electronic device during data transport between the electronic device (client device) and other electronic device (host device). The data transport by using the MPTCP can be carried out through one or more communication interfaces available on the client device in conjunction with one or more communication interfaces available on the host device or provided by a proxy device at the host device end. The method includes monitoring one or more factors associated with the MPTCP implemented in the client device. Further, based on the one or more factors that are monitored, the method includes determining whether to enable the MPTCP in the electronic device for a current data transport. Thereafter, the method includes determining an interface mode, among a plurality of interface modes provided for the MPTCP, to control a plurality of subflows of the MPTCP when the MPTCP is enabled for the current data transport. The plurality of interface modes includes interface mode 1 through interface mode 10 that enable controlling plurality of subflows based on one or more factors monitored for the MPTCP. The method further includes dynamically switching the interface mode of the MPTCP during the current data transport based on the one or more factors being monitored during the current data transport. Embodiments further disclose a method for managing a multipath transmission control protocol (MPTCP) in a first electronic device communicating with a second electronic device, wherein the first electronic device includes first communication interfaces and the second electronic device includes second communication interfaces. The method comprises monitoring factors associated with the MPTCP and enabling the MPTCP. Further, the method comprises determining an interface mode, among a plurality of interface modes, to control a plurality of subflows of the MPTCP based on the factors. Furthermore, the method comprises switching from the interface mode to another interface mode during a current data transport based on the factors.

In an embodiment, the electronic device (client device) can be a mobile phone, a smart phone, a laptop, a palmtop, a tablet, a server in data centers, a wearable computing device, an IoT (Internet of Things) device or any other network communication interface with one or more interface(s).

In an embodiment, the host device can also be a server and the like.

Referring now to the drawings, and more particularly to FIGS. 1 to 16, where similar reference characters denote corresponding features consistently throughout the figures, there are shown embodiments.

FIG. 1 illustrates an example multipath transmission control protocol (MPTCP) environment 100 for managing MPTCP-based data transport between electronic devices (host device 104 and client device 102), according to embodiments of the present disclosure. The client device 102 and the host device 104 may have plurality of communication interfaces available for communication. The communication interfaces can include WI-FI® interface, a long term evolution (LTE) interface, near field communication (NFC) interface, BLUETOOTH® interface and so on. The client device 102 can be configured to use at least one of the available communication interfaces for data transport, in accordance with the MPTCP, between the client device and the host device by creation a plurality of subflows such as subflows 1 to subflow N. The client device 102 comprises an MPTCP optimizer unit (an MPTCP controller) 212 in addition to standard modules of the MPTCP, wherein the MPTCP optimizer unit 212 enables MPTCP implementation in the client device to optimize power and data consumption. The power and data consumption is adjusted by dynamically controlling the subflows and a plurality of interface modes of the MPTCP before and during the data transport. The controlling of the subflows is based on one or more factors associated with the MPTCP implemented in the client device 102. The factors include user activity, device events, bandwidth requirement of the current data to be transported and a user setting corresponding to an application of the client device 102, for which the current data transport is to be carried out and the like. The term MPTCP optimizer unit may be interchangeable with the term MPTCP controller.

Thus the proposed MPTCP implementation in the client device 102 provides automatic enabling of MPTCP based on the user activity using learning algorithms. Further, provides dynamic control of subflows during the current ongoing data transport by opening additional subflows or closing existing subflows based on user activity (such as idle mode, idle download, periodicity sync up mode, and so on). The dynamic control of the subflows is achieved by dynamically identifying a particular mode to be applied for the current data transport based on one or more factors monitored. The plurality of interface modes include interface mode 1 to interface mode 10 as explained in conjunction with FIGS. 3A through 3J respectively. One or more factors comprises user activity, device events, bandwidth requirement of the current data to be transported and the user setting corresponding to an application from a plurality of applications on the electronic device for which the current data transport is to be carried out.

The user activity identified may include idle mode, idle download, periodicity sync up mode, and so on. Further, the device events include device parameters such as battery condition, radio parameters such as signal condition, device location, and so on.

The client device 102 can be configured to enable a user to selectively apply the user setting to each application individually or for a group of applications. The user setting enables setting a MPTCP on mode, MPTCP off mode or a MPTC backup mode or the like selectively for any application based on user interest. Further, the client device 102 can be configured to utilize subflows on need basis to provide dynamic control of subflows during data transport such as media data (video and/or audio).

Figure 2A:
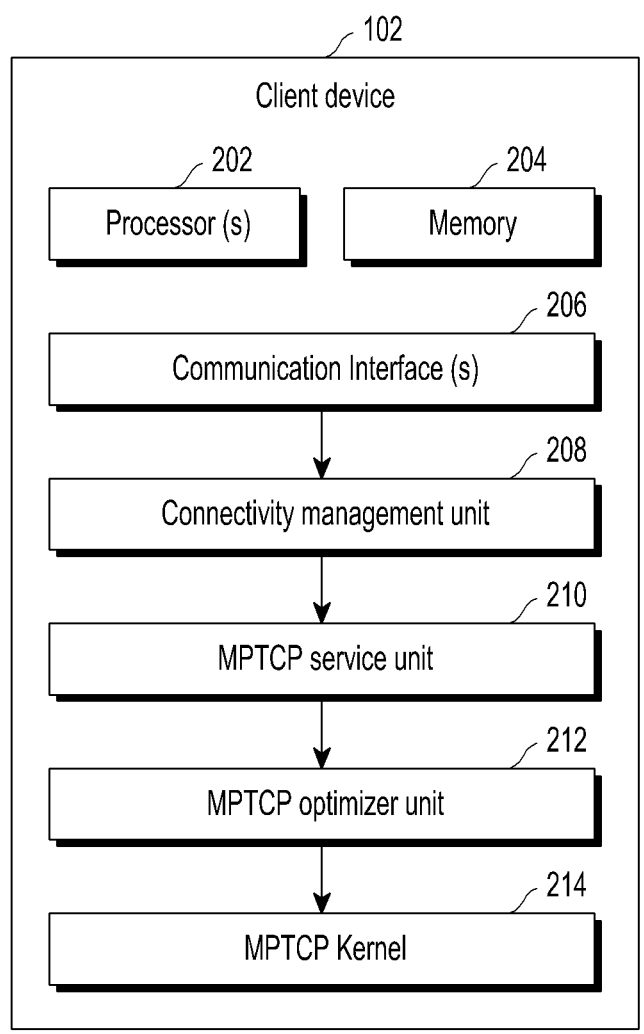
FIGS. 2A and 2B illustrate a plurality of components of the client device for managing MPTCP based data transport between the host device and the client device, according to embodiments of the present disclosure.
Figure 2B:
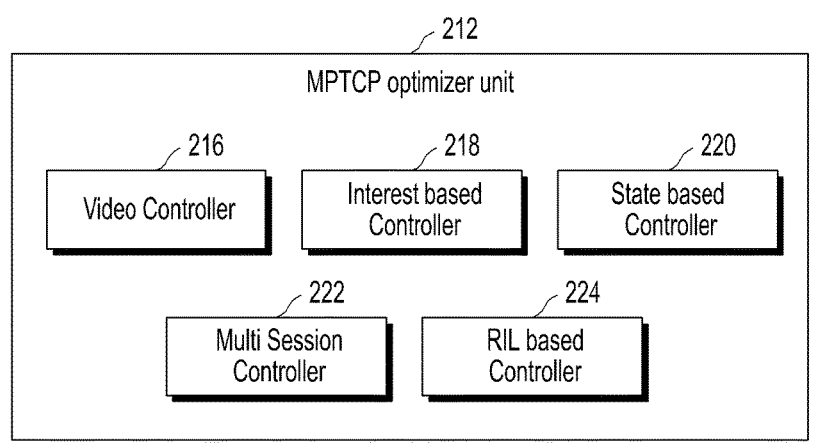

FIGS. 2A and 2B illustrate a plurality of components of the client device 102 for managing MPTCP based data transport between the host device 104 and the client device 102, according to embodiments of the present disclosure.

Referring to FIG. 2A, the client device 102 is illustrated in accordance with an embodiment of the present subject matter. In an embodiment, the client device 102 may include a processor 202, communication interface(s) 206, and a memory module 204. The communication interface(s) 206 may include, for example, a Wi-Fi interface, a LTE interface a Bluetooth interface and the like enabling data transport between the client device 102 and the host device 104 in accordance with the MPTCP. The client device 102 can also include a User Interface (UI) such as a graphical user interface and the like for user interaction to set the user settings, wherein the user settings enable the user to set one of MPTCP on mode, the MPTCP off mode, the MPTCP backup mode or the like individually to each application or to a set of desired applications grouped together. Each application may be identified by an identifier (ID) and a corresponding MPTCP mode can be maintained for the application ID. Further, the client device 102 comprises various standard modules or units for the MPTCP implementation such as connectivity management unit 208, an MPTCP service unit 210 and an MPTCP kernel 214. In addition the client device 102 comprises an MPTCP optimizer unit (an MPTCP controller) 212 for managing the MPTCP by dynamically changing the interface mode for the current data transport to control the sub flows of the MPTCP, wherein the interface mode determined for the current data transport is based on power consumption and data consumption criteria.

Meanwhile, the method for managing multipath transmission control protocol (MPTCP) according to an example embodiment of the present disclosure may be implemented on the computer system or recorded in a recording medium. The computer system may include at least one or more processors (e.g., including processing circuitry) 202 and a memory 204.

The processor 202 may include various processing circuitry, such as, for example, and without limitation, a central processing unit (CPU) or a semiconductor device processing commands stored in the memory 204.

The processor 202 may be a controller comprising processing circuitry controlling all the operations of the computer system. The controller may run operations of the computer system by reading and running program codes stored in the memory 204. For example, an MPTCP controller 212 comprises the processor 202 and the memory 204.

The memory 204 may include various types of volatile or non-volatile storage media. For example, the memory 204 may include a read only memory and a random access memory.

Accordingly, the method for managing MPTCP may be implemented in such a manner as to be able to run on a computer, according to an example embodiment of the present disclosure. According to an embodiment of the present disclosure, when the method for managing MPTCP is performed on a computer device, computer readable commands may perform the operation method according to the present disclosure.

The apparatus for managing multipath transmission control protocol (MPTCP) comprising: a memory storing a program for providing a module for managing MPTCP; and a processor configured to execute the program, wherein the program, when executed by the processor causes the processor at least to: monitor at least one factor associated with the MPTCP implemented in the electronic device; enable the MPTCP in the electronic device for a current data transport based on the at least one factor, wherein the data transport for the MPTCP is carried out through at least one communication interface on the electronic device; determine an interface mode, among a plurality of interface modes provided for the MPTCP, to control a plurality of subflows of the MPTCP when the MPTCP is enabled for the current data transport, wherein the plurality of subflows are controlled based on the at least one factor monitored for the MPTCP; and switch the interface mode during the current data transport based on the at least one factor being monitored during the current data transport.

In an embodiment, the MPTCP optimizer unit (the MPTCP controller) 212 can be configured to monitor one or more factors associated with the MPTCP implemented in the client device. Further, based on the one or more factors that are monitored, the MPTCP optimizer unit 212 can be configured to determine whether to enable the MPTCP in the electronic device (client device 102) for the current data transport. Thereafter, the MPTCP optimizer unit 212 can be configured to determine the interface mode, among a plurality of interface modes provided for the MPTCP, to control the plurality of subflows of the MPTCP when the MPTCP is enabled for the current data transport. The plurality of subflows is controlled based on one or more factors monitored for the MPTCP. Further, the MPTCP optimizer unit 212 can be configured to dynamically switch the interface mode of the MPTCP during the current data transport based on the one or more factors being monitored during the current data transport.

FIG. 2B illustrates a plurality of controller modules within the MPTCP optimizer unit 212 that are configured to control the subflows and interface modes of the MPTCP. The plurality of controller modules include a video controller 216, an interest based controller 218, a state based controller 220, a multisession controller 222 and a radio interface layer (RIL) based controller 224. The control of the subflows using various user setting, a plurality of interface modes of MPTCP in accordance with the various modules of the MPTCP optimizer unit 212 are explained in conjunction with FIG. 5 through FIG. 15.

FIGS. 3A to 3J illustrate the plurality of interface modes of the MPTCP for the data transport, according to embodiments of the present disclosure. FIGS. 3A to 3J depict the plurality of interface modes of the MPTCP for client device 102 and the host device 104 that the MPTCP optimizer unit may select to carry out the current data transport. As an example, the figures depict the client device 102 and the host device 104 capable of communicating using the MPTCP using two communication Interfaces (CIs, namely CI-1 say a Wi-Fi interface and CI-2 a LTE interface).

Figure 3A:
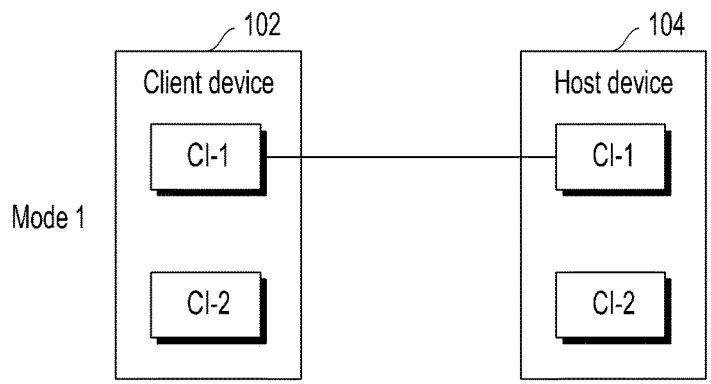
FIGS. 3A to 3J illustrate a plurality of interface modes of the MPTCP for the data transport, according to embodiments of the present disclosure.
Figure 3B:
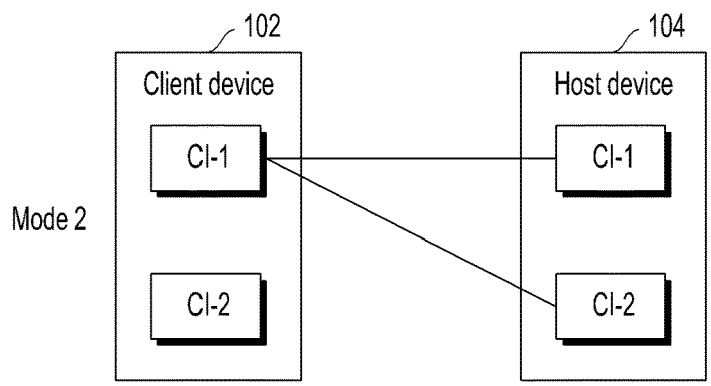
Figure 3C:
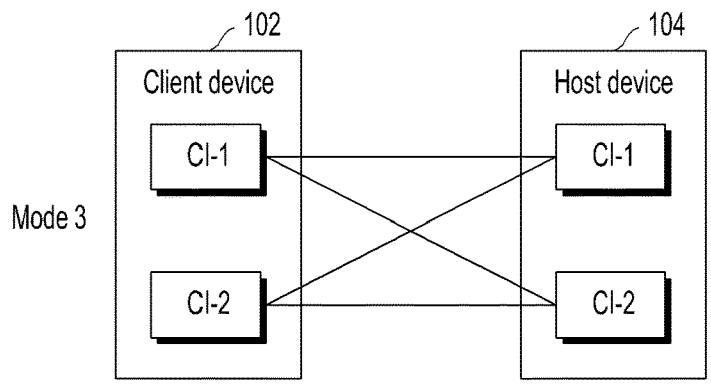
Figure 3D:
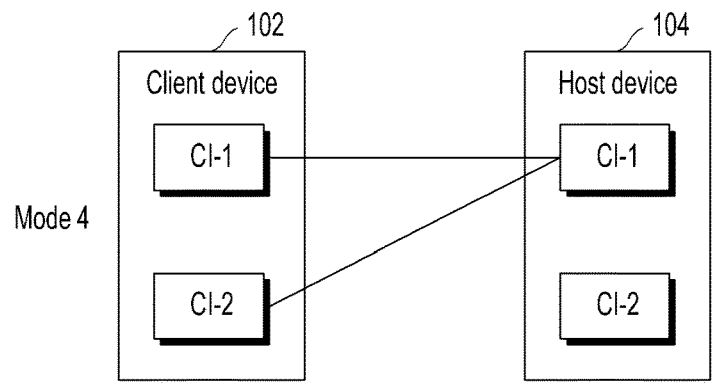
Figure 3E:
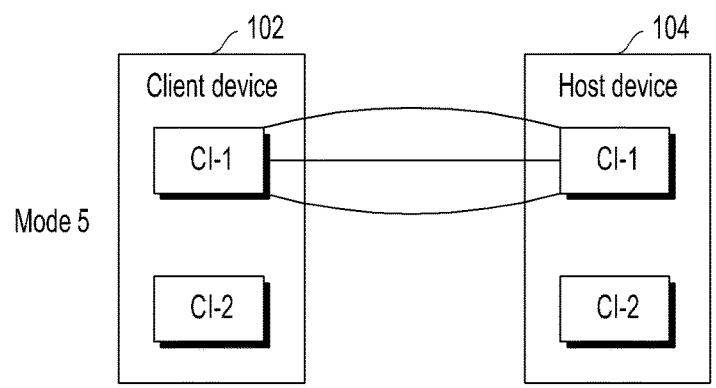
Figure 3F:
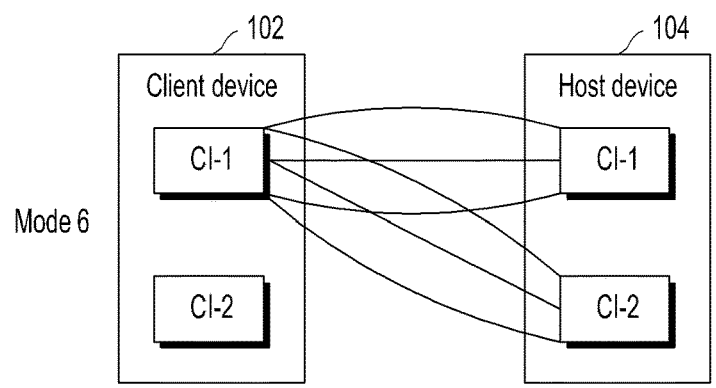
Figure 3G:
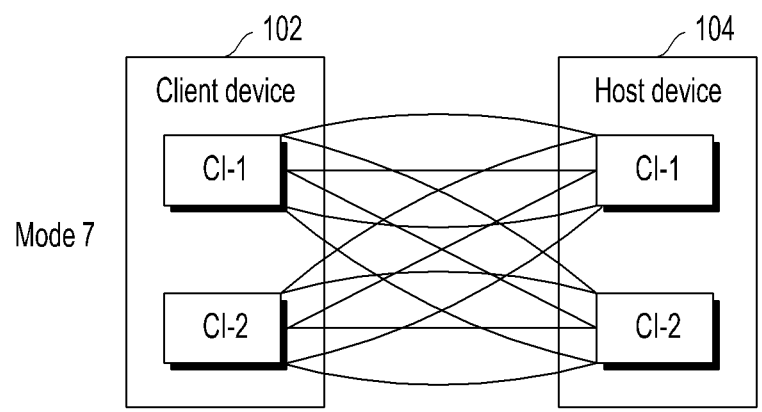
Figure 3H:
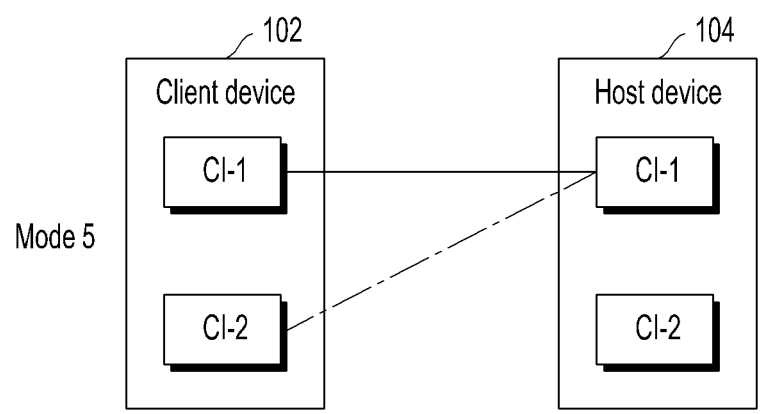
Figure 3I:
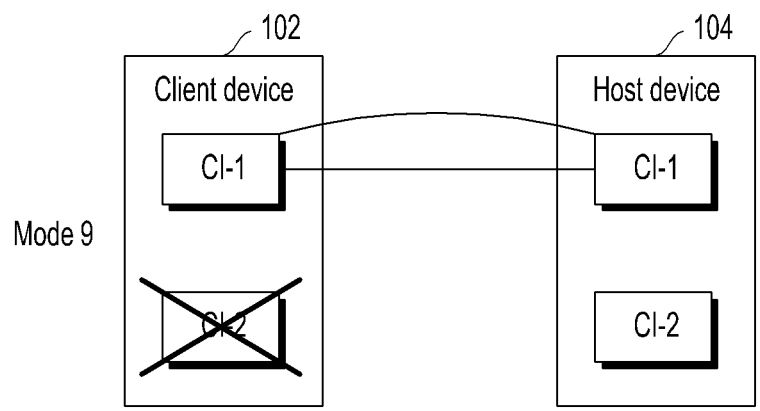
Figure 3J:
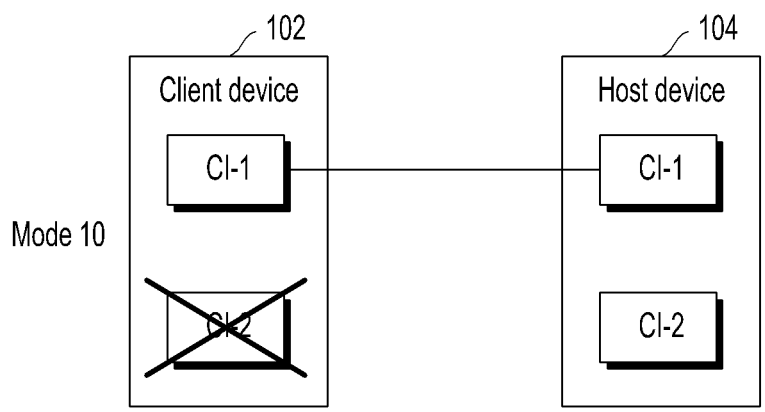
Figure 4:
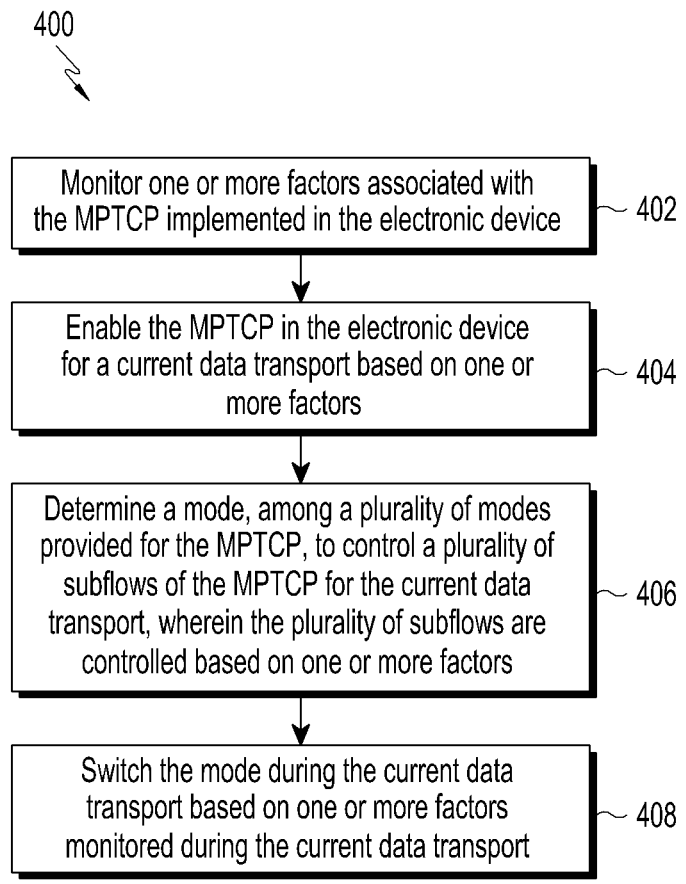
FIG. 4 illustrates a method for managing MPTCP to control a plurality of subflows of the MPTCP for data transport between the host device and the client device, according to embodiments of the present disclosure.

FIG. 3A illustrates an interface mode 1 of the MPTCP where only one communication interface (CI-1) of both the client device 102 and the host device 104 is used. FIG. 3B depicts an interface mode 2 of the MPTCP where client is set with default mode (interface mode 1 with usage of only CI-1) and the host device 104 is set with a fullmesh mode of the MPTCP implementation. FIG. 3C depicts an interface mode 3 of the MPTCP where both the client device 102 and the host device 104 are set with the fullmesh mode using all the available CIs (CI-1 and CI-2) of both the devices. FIG. 3D depicts an interface mode 4 of the MPTCP where the client device 102 is set with fullmesh mode and the host device 104 is set with default mode (interface mode 1 with only CI-1), according to embodiments of the present disclosure. FIG. 3E depicts an interface mode 5 of the MPTCP where the client device 102 is set with Ndiff default mode operation, wherein multiple ports are opened for a single communication interface (CI-1) at the client device 102 and the host device 104. FIG. 3F depicts an interface mode 6 of MPTCP proposed by the method, where the client device 102 is set with Ndiff default mode at only one communication interface CI-1 and the host device 104 is set with fullmesh mode utilizing both the communication interfaces, CI-1 and CI-2. FIG. 3G depicts an interface mode 7 of the MPTCP where both the client device 102 and the host device 104 are set with Ndiff fullmesh operation. FIG. 3H depicts an interface mode 8 of MPTCP where one interface in the client device 102 is set as default and another is set as backup communication interface, according to embodiments of the present disclosure. FIG. 3I depicts an interface mode 9 of the MPTCP where the client device 102 operating at MPTCP can disconnect one or more communication interfaces and continue with MPTCP with primary interface (here CI-1). FIG. 3J depicts an interface mode 10 of the MPTCP where the client device 102 operating at MPTCP can disconnect one or more communication interfaces and fallback to TCP with the primary interface FIG. 4 illustrates a method 400 for managing an MPTCP to control the plurality of subflows of the MPTCP for data transport between the host device 104 and the client device 102, according to embodiments of the present disclosure. At step 402, the method 400 allows the MPTCP optimizer unit 212 to monitor one or more factors associated with the MPTCP implemented in the client device 102. The factors may comprise at least one of user activity of the user of the client device 102, device events detected by the client device 102, bandwidth requirement of the current data to be transported and/or user setting corresponding to an application from a plurality of applications on the electronic device (client device 102), for which the current data transport is to be carried out. The user setting comprises the MPTCP on mode, the MPTCP off mode, the MPTCP backup mode and similar modes that can be selectively applied by the user for a particular application or a set comprising plurality of application grouped by the user.

Further, based on one or more factors that are monitored, at step 404, the method 400 allows the MPTCP optimizer unit 212 to determine whether to enable the MPTCP in the electronic device (client device 102) for the current data transport. Once the MPTCP is decided to be implemented, thereafter, at step 406, the method 400 allows the MPTCP optimizer unit 212 to determine an interface mode, among the plurality of interface modes provided for the MPTCP (as in FIGS. 3A to 3J) to control the plurality of subflows of the MPTCP. The method 400 provides additional interface modes (interface mode 6 and interface mode 7) as described in FIGS. 3F and 3G. The plurality of subflows are controlled based on one or more factors monitored for the MPTCP, wherein the interface mode determined for the current data transport is selected to provide adaptive power consumption and data consumption. Additionally, the interface mode determined for the current data transport is selected to provide adapted power utilization in multipathing and multihoming conditions. For example, when MPTCP is on and when the device goes to idle state, then n*m (where n is the number of subflow and m is the current active application socket) number connections are opening in the android client to be linked with the server. Further, at step 408, the method 400 allows the MPTCP optimizer unit 212 to dynamically switch the interface mode of the MPTCP during the current data transport based on the one or more factors being monitored during the current data transport so as to achieve adaptive power consumption and data consumption. The control of the subflows using various user setting and the plurality of interface modes of MPTCP in accordance with the various modules of the MPTCP optimizer unit 212 are explained in conjunction with FIG. 5 through FIG. 10.

The dynamic control aspect is better explained below with an example. When an application such as a video application (for example, YouTube), which is operating in fullmesh mode utilizes both LTE and WI-FI® even if WI-FI® speed is enough for the video streaming. By dynamic control, the method 400 checks if WI-FI® speed is enough for the current video to stream. If Wi-Fi speed is enough for the current video to stream, the interface mode is automatically switched to using Wi-Fi interface only (e.g., interface mode 1 or interface mode 5) during the current data being transported (e.g., video being streamed). However, if WI-FI® is unable to provide the desired speed for data, the method 400 enables switching back to fullmesh mode. Additionally, when a user have a special data plan (e.g., free data package), though WI-FI® speed is enough for the current video to stream, the method 400 enables switching back to Ndiff fullmesh mode, like interface mode 7.

The various actions in method 400 may be performed in the order presented, in a different order, repeatedly or simultaneously. Further, in some embodiments, some actions listed in FIG. 4 may be omitted.

Figure 5A:
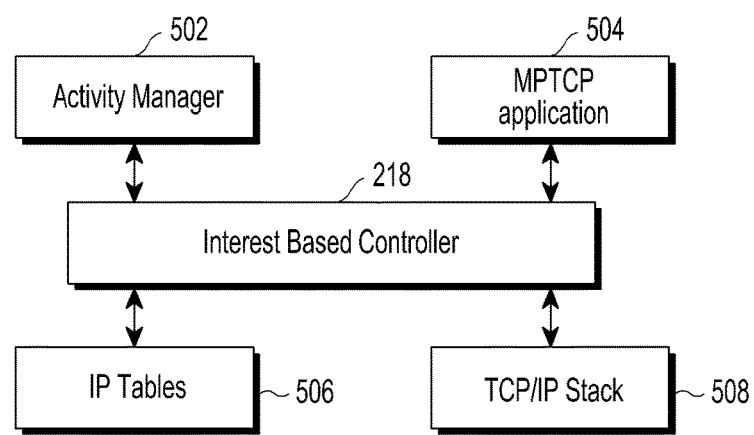
FIG. 5A illustrates managing of an MPTCP to control a plurality of subflows of the MPTCP based on an interest based controller of an MPTCP optimizer unit (MPTCP controller) 212 within a client device, according to various embodiments of the present disclosure.

FIG. 5A illustrates managing of the MPTCP to control the plurality of subflows of the MPTCP based on the interest based controller 218 of the MPTCP optimizer unit 212 within the client device 102, according to embodiments of the present disclosure. The interest based controller 218 can be configured to communicate with internet protocol (IP) tables 506 and a TCP/IP stack 508 to enable user settings being applied selectively to an application or group of applications. The interest based controller 218 can be configured to exchange information with an activity manager 502 and a MPTCP application 504 resident on the client device 102 as depicted in example user interfaces UIs in FIGS. 5B and 5C.

Figure 5B:
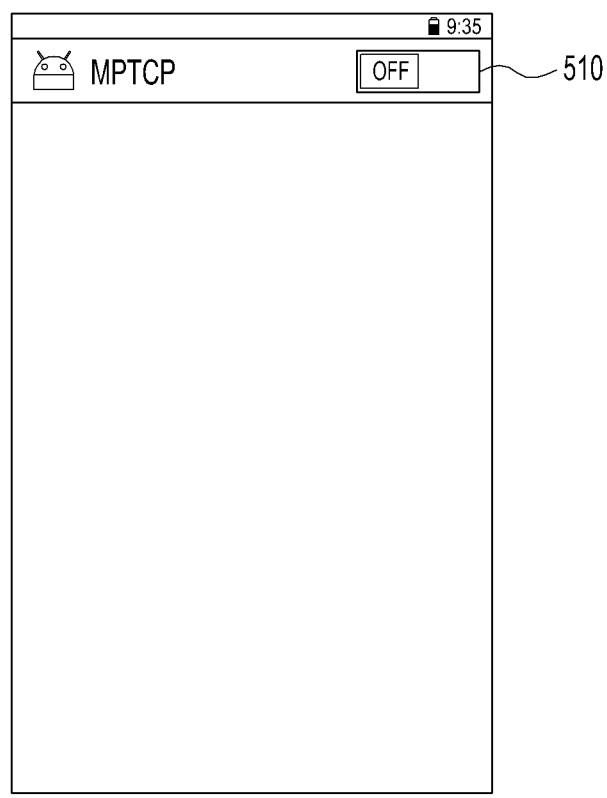
FIGS. 5B and 5C illustrate an example User Interface (UI) provided to a user for managing the MPTCP based on the interest based controller, according to embodiments of the present disclosure.
Figure 5C:
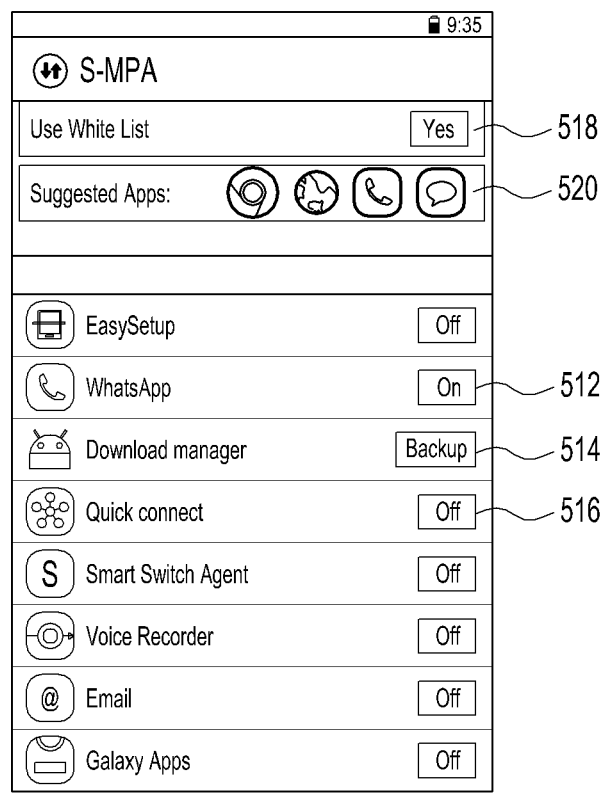

FIGS. 5B and 5C illustrate an example user interface (UI) provided to a user for managing the MPTCP based on the interest based controller 218, according to embodiments of the present disclosure. FIG. 5B depicts a UI 510 indicating that the MPTCP application 504 is inactive. Once the user enables the MPTCP application, then as depicted in UI of FIG. 5C, the user individually can enable MPTCP settings, for example MPTCP on 512 for WHATSAPP® application, MPTCP backup 514 for Download manager application and MPTCP off 516 Quick Connect application. Thus, the user can selectively control the applications in MPTCP enabled state.

In an embodiment, the interest based controller 218 may be configured to suggests/recommends the user with the applications (suggested apps 520) to be chosen for MPTCP on setting based on the activity of the user, type of application, location based learning, and/or other operational conditions. Once user sets the user setting for the applications, then for MPTCP on mode setting the MPTCP is set from interface mode 1 to 7, for MPTCP backup mode setting interface mode 8 and for MPTCP off mode setting interface mode 9 or 10 is applied. The interface modes 1 to Mode 10 are as explained in conjunction with FIGS. 3A to 3J.

In an embodiment, an option whether to apply white list 518 per application during MPTCP is provided to the user.

Examples provided below may help to better understand FIGS. 5B and 5C.

In a scenario, the user might have subscribed to special data plan, for example, a service provider AIRTEL® provides a scheme with 1 GB LTE+500 mb whatsapp/facebook free. In another case the data plan of another device provider AIRCEL may provide free basic browsing for apps such as whatsapp/fb. In another case, a service provider, say, KOREA SKT may provide free browsing for its skt apps or Reliance HO (RJIO) might allow free surfing on the RJIO Apps.

Figures 6A, 6B, 6C, 6D:
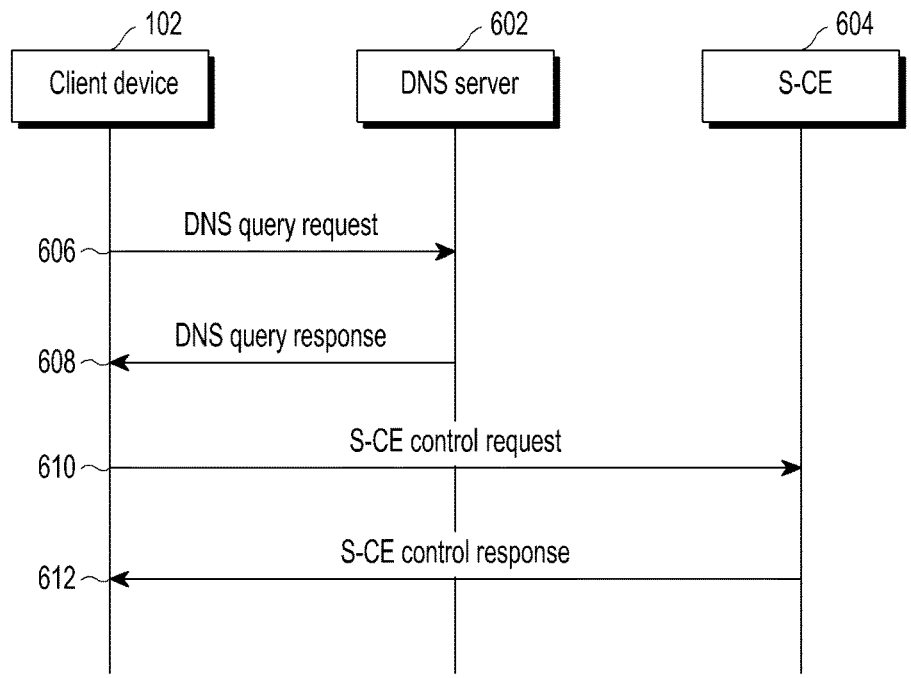
FIG. 6A illustrates a sequence diagram for client device and a Server and Cloud Environment (S-CE) interaction for managing the MPTCP based on the interest based controller according to embodiments of the present disclosure.
FIGS. 6B to 6D illustrate formats for control messages utilized for communication with the S-CE, according to embodiments of the present disclosure.

In this case, the user might be interested only in these app so would enable MPTCP, i.e. set MPTCP on mode for these app and others by default would be off There could be also a system, wherein operator might specify the default list of apps which can be freely used or under special subscription scheme, and these apps could be set as MPTCP on mode/MPTCP off mode/MPTCP backup mode accordingly. The user might or might not turn manually based on the design FIG. 6A illustrates a sequence diagram for client device 102 and a server and cloud environment (S-CE) 604 interaction for managing the MPTCP based on the interest based controller 218 according to embodiments of the present disclosure. The communication depicted in FIG. 6A can be initiated by the MPTCP optimizer unit 212 in scenarios where download of data for one or more applications specified by the service provider may be free download or in scenarios where access of data for the application on a specific subscriber identify module (SIM) is free. Thus, information related to such applications can be accessed from the S-CE server 604 and used by the interest based controller 218 when the MPTCP is enabled on the client device 102. The FIG. 6A depicts control messages being sent and received by the client device 102. The client device sends (606) a DNS query request to a domain name service DNS server 602, which responds (608) to the client device 102 with a DNS query response. The client device 102 then sends (610) an S-CE control request to the S-CE 604, which responds (612) to the client device 102 with the S-CE control response.

FIGS. 6B, 6C, and 6D illustrate formats for control messages utilized for communication with the S-CE 604, according to embodiments of the present disclosure. The S-CE's 604 control messages are packed using the format depicted in FIG. 6B depicts the format for the S-CE control message. FIG. 6C depicts the S-CE control request data field. FIG. 6D depicts the S-CE control response data field. The information messages field can be packed as: <character>=<value>, where, character can be a single case significant character and value can be structured text whose format depends upon attribute type. Values can use a suitable encoding such as UTF-8 encoding. In an embodiment herein, whitespace need not be present immediately to either side of the '=' sign.

w=* (whitelisted application detail)
    b=* (blacklisted application detail)
    c=* (gateway connection information)

Figure 7:
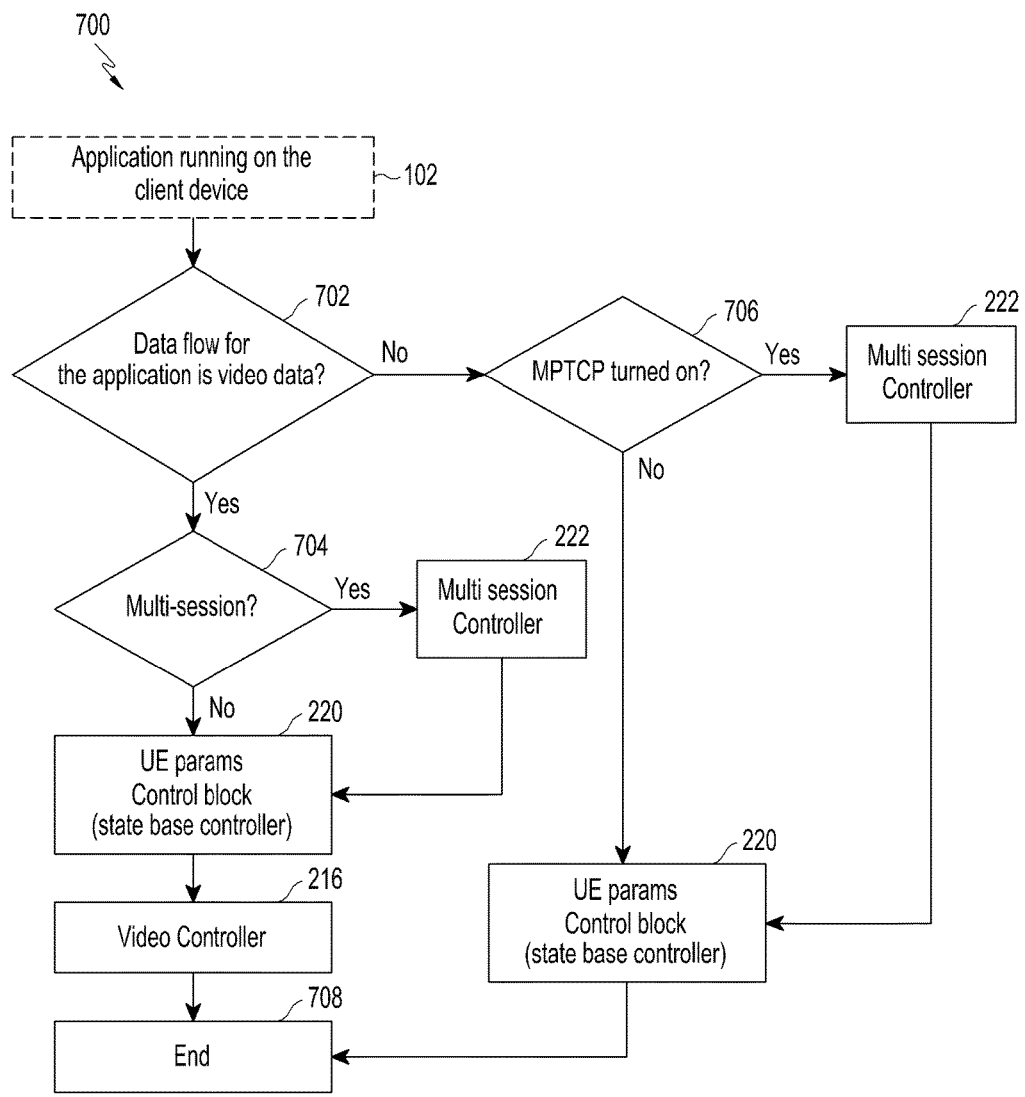
FIG. 7 illustrates a method for implementation of the MPTCP management within an example active application for data transport associated with downloading of a video, according to embodiments of the present disclosure.

FIG. 7 illustrates a method 700 for implementation of the MPTCP management within an example active application for data transport associated with downloading of a video, according to embodiments of the present disclosure. For example, when an application is a browser application and once a socket is opened for data transport for the application, at step 702 the method 700 allows the MPTCP optimizer unit 212 to detect (702) whether data content downloaded corresponds to video (a video clip being played or non-video section (such as mere browsing). Upon detecting the type of data being downloaded is a video data, at step 704 the method 700 allows the MPTCP optimizer unit 212 to hand over the control to the respective modules or units within the MPTCP optimizer unit 212 such as the multi session controller 222 in case a multi session is required, the UE params control block (state based controller 220, UE parameters controller) and then the video controller 216.

If the data type detected is a non-video data, at step 706, it is determined whether the MPTCP is turned on. If it is turned on, then the data is handled by the multisession controller 222 and then the UE params control block (state based controller 220). If it is not turned on, then the data is handled by the UE params control block (state based controller 220). Once the respective controllers perform the functions, as are explained in conjunction with FIG. 8, FIG. 9 and FIG. 10, then at step 708 the MPTCP process ends.

Figure 8:
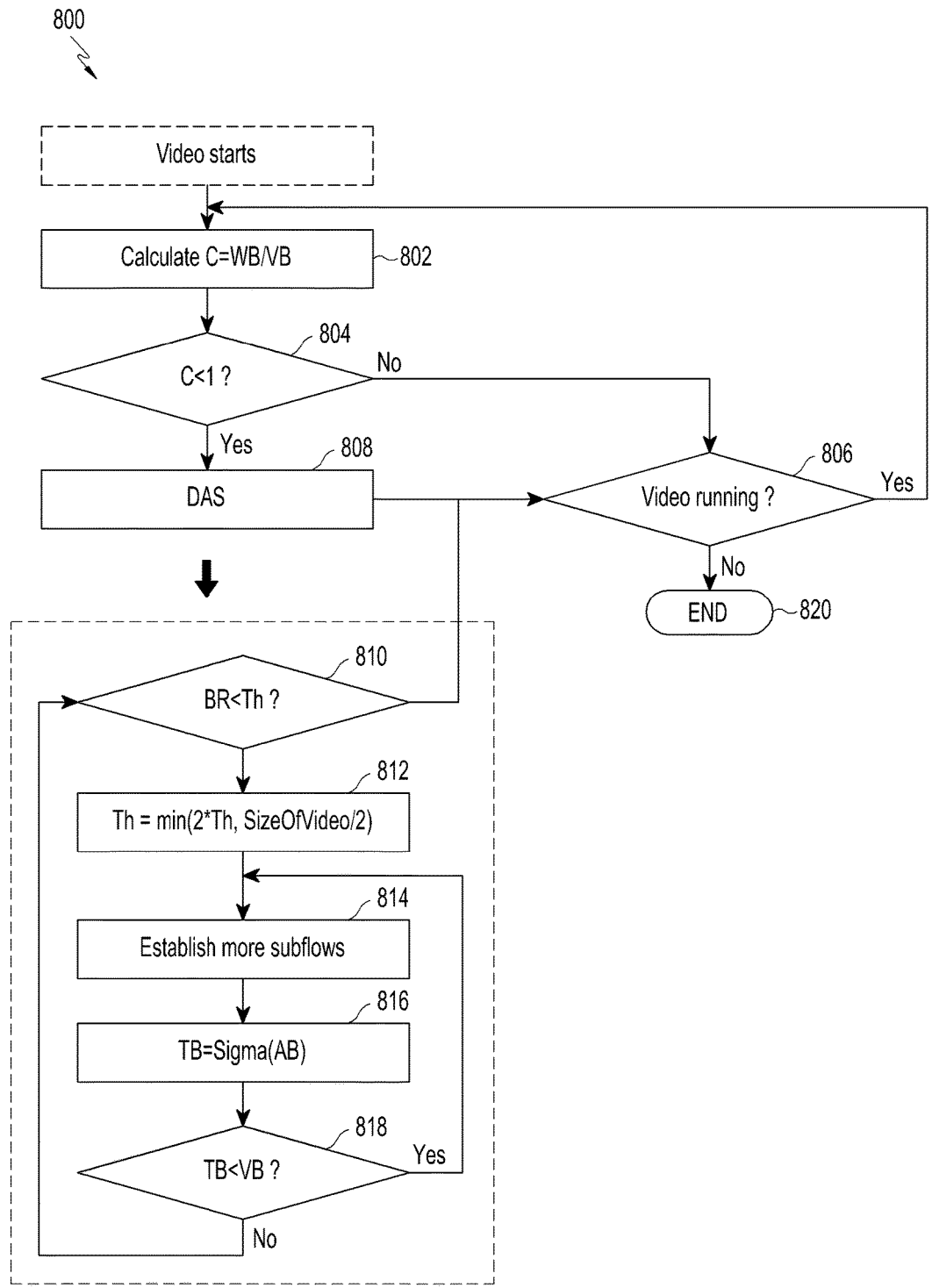
FIG. 8 illustrates a method for managing of the MPTCP to control the plurality of subflows for the video download based on a video controller of the MPTCP optimizer unit, according to embodiments of the present disclosure.

FIG. 8 illustrates a method 800 for managing of the MPTCP to control the plurality of subflows for the video download based on the video controller 216 of the MPTCP optimizer unit 212, according to embodiments of the present disclosure. Here, WB is the Wi-Fi Bandwidth and VB is the video bandwidth. On start of the video, at step 802, the method 800 allows the video controller 218 to calculate C, wherein C=WB/VB. At step 802, the method 800 allows the video controller 218 to check if C is less than or greater than 1 (which can be a predefined value). If C is greater than 1 then at step 806, the method 800 allows the video controller 218 to a check if the video is running and if the video is running the computation for C is repeated. The video is an example of a large-size file, and is not limited to an actual video file.

However if C is less than 1, then a dynamic adaptive subflow (DAS) mechanism is performed at step 806. The steps of DAS mechanism are as depicted in steps 810 through 818. Once the DAS is performed, the flow of method 800 returns to the video running check step 806.

The DAS 808, explained below, determines if the MPTCP subflow control is to be used at the current network condition. Here Cp=current pivot, Lp=loaded pivot, BR=Boost Required=Lp−Cp, Th=threshold (initialized to 1 Megabyte), TB=Total Bandwidth, AB=available bandwidth, Sigma (AB)=summation of all AB and VB=video bandwidth At step 810, if BR<Th, Th is calculated at step 812 as min (2*Th, sizeofvideo/2) and more subflows are established at step 814. At step 816 the TB is calculated as sigma (AB). IF TB<VB (818), interface mode 2 to 7 is set and thereby more subflows are established. The TB is not less than VB, and then the process repeats.

If size of video cannot be fetched (Real Time Streaming), then it can be set as maximum (Upper Limit of the type) and from the values obtained the interface mode of the MPTCP subflows is chosen dynamically.

Figure 9:
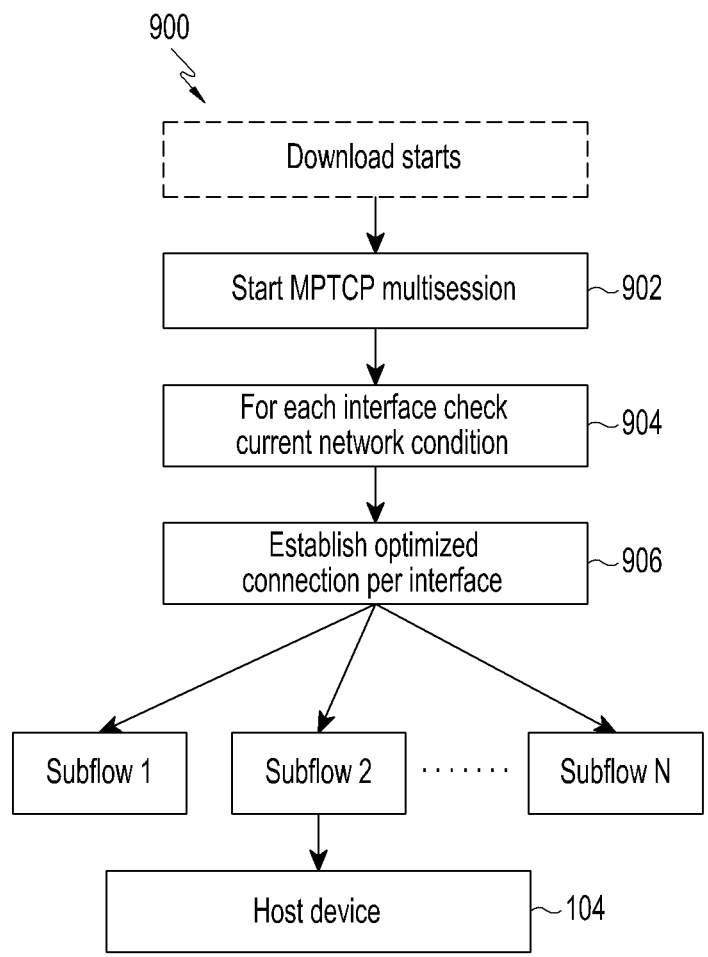
FIG. 9 illustrates a method for managing of the MPTCP to control the plurality of subflows for the data transport based on a multisession controller of the MPTCP optimizer unit, according to embodiments of the present disclosure.

FIG. 9 illustrates a method 900 for managing of the MPTCP to control the plurality of subflows for the data transport based on the multisession controller 222 of the MPTCP optimizer unit 212, according to embodiments of the present disclosure. The multisession controller 222 can be configured to control the number of connections in the interface mode 5, interface mode 6 and interface mode 7 depicted in FIG. 3E, FIG. 3F and FIG. 3G. Multiple communication interfaces (CIs) on the client device 102 can have different number of connections or ports. For example, the WI-FI® can establish 3 subflows and 4G LTE interface can establish 2 subflows. At step 902, on starting a download of information, the method 900 allows the multisession controller 222 to start the multisession. For each communication interface, at step 904, the method 900 allows the multisession controller 222 to check current network condition for criteria such as Round Trip Time (RTT), packet loss, distance, and so on. At step 906, the method 900 allows the multisession controller 222 to establish optimized connection is per communication interface. Then, at step 908, the method 900 allows the multisession controller 222 to establish multiple subflows. A table 1 and table 2 below depict example test results for MPTCP multisession where information is being downloaded. Table 1 and table 2 correspond to test results for 500 MB and 100 MB of information being downloaded respectively.

TABLE 1

50 MB download

| | Number Of Subflow | | | | |
|---|---|---|---|---|---|
| | 1 | 2 | 3 | 5 | 10 |
| Speed in Mbps | 58.2 | 75.4 | 76.3 | 70.3 | 68.7 |
| | 75.1 | 77.2 | 76.5 | 66.9 | 61.9 |
| | 55.4 | 88.4 | 76.4 | 66.9 | 61.9 |
| | 60.2 | 79.3 | 72.5 | 71.7 | 56.9 |
| | 78 | 69.3 | 71 | 82.9 | 75.1 |
| Average speed | 65.38 | 77.92 | 74.54 | 71.74 | 64.9 |

As we see in Table 1, the best throughput is not fixed with the number of subflows established. Hence the method proposed provides dynamic number of subflows based on the current network/operation conditions and the file download. Similarly, the data in Table 2 below can be interpreted.

TABLE 2

100 MB download

| | Number Of Subflow | | |
|---|---|---|---|
| | 1 | 2 | 3 |
| Speed in Mbps | 76.5 | 103.3 | 94.4 |
| | 69.8 | 94.8 | 98.4 |
| | 90.9 | 90.3 | 95.9 |
| | 64.4 | 84.9 | 80.1 |
| | 64.4 | 101 | 77.4 |
| Average speed | 73.2 | 94.86 | 89.24 |

Figure 10:
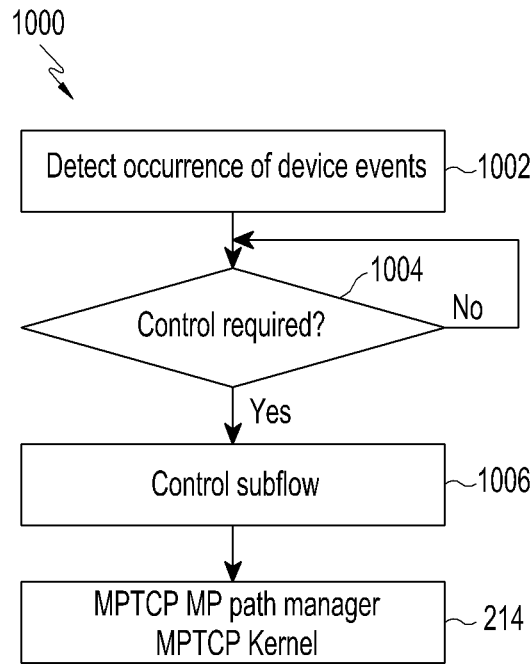
FIG. 10 illustrates a method for managing of the MPTCP to control the plurality of subflows for the data transport based on a state based controller of the MPTCP optimizer unit, wherein the state based controller functions in accordance with device events detected for the client device, according to embodiments of the present disclosure.

FIG. 10 illustrates a method 1000 for managing of the MPTCP to control the plurality of subflows for the data transport based on the state based controller 220 of the MPTCP optimizer unit 212, wherein the state based controller functions in accordance with device events detected for the client device 102, according to embodiments of the present disclosure. At step 1002, the method 1000 allows the state based controller 220 to detect occurrence of any device event. For example, the device event can be battery state change event, location state change event, signal state change events, serial input output port (SIOP) state change event, radio events such as roaming, SIM status, Access Point (AP) mode, handover scenarios, device state idle/active and/or the like. At step 1004, the method 900 allows the state based controller 220 to check if control of the subflows is required and at step 1006 the control subflow is established if required.

Figure 11:
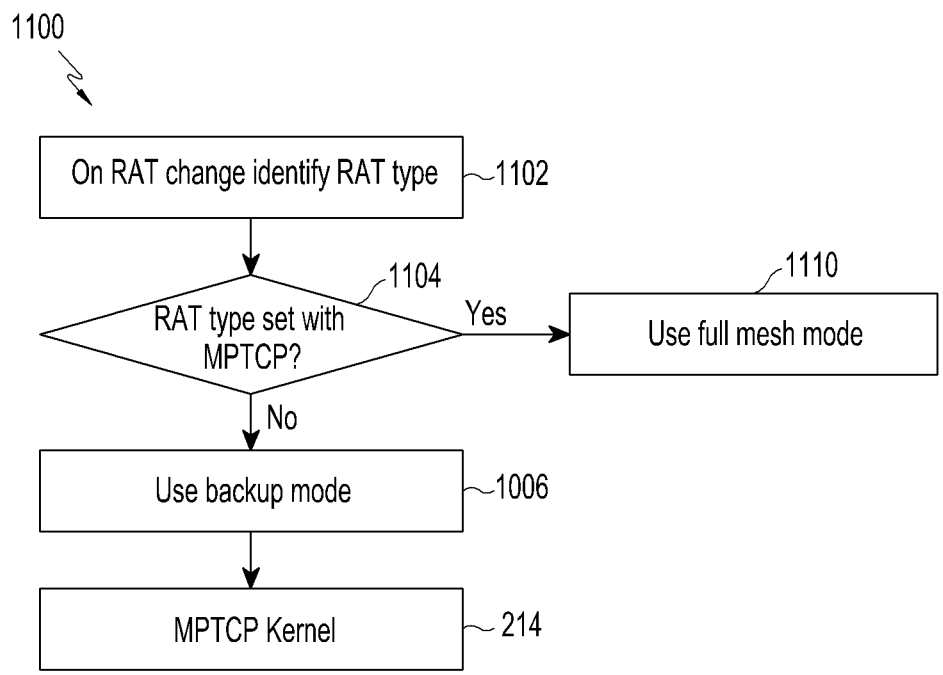
FIGS. 11 and 12 illustrate methods for managing of the MPTCP to control the plurality of subflows for the data transport based on a radio interface layer (RIL) based controller of the MPTCP optimizer unit, according to the embodiments of the present disclosure.
Figure 12:
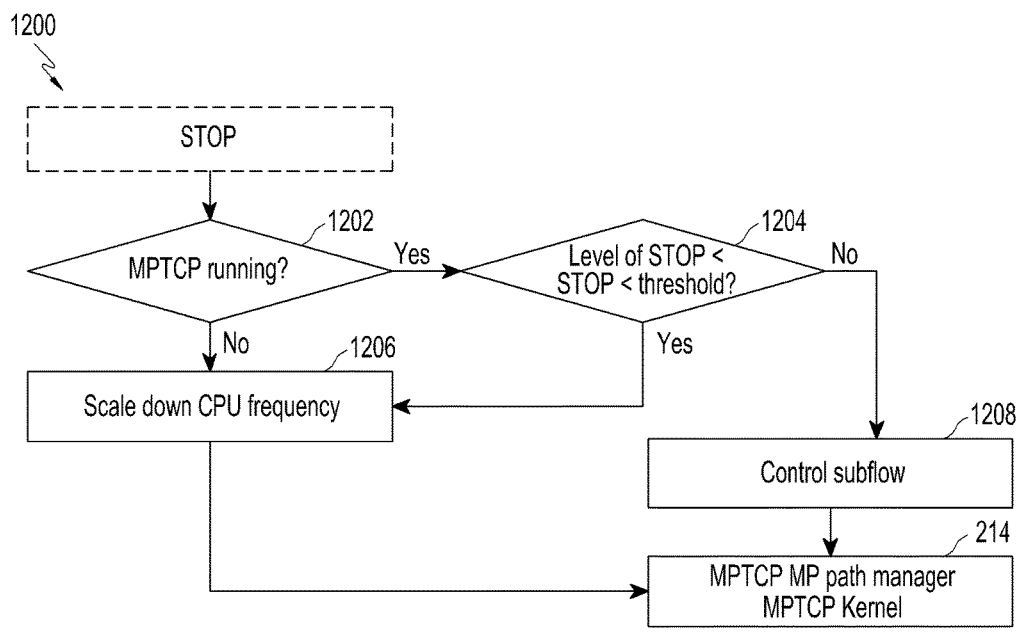

FIGS. 11 and 12 illustrate method 1100 and method 1200, respectively, for managing of the MPTCP to control the plurality of subflows for the data transport based on a radio interface layer (RIL) based controller 224 of the MPTCP optimizer unit 212, according to the embodiments of the present disclosure.

At step 1102, the method 1100 allows the RIL based controller 224 to identify radio access technology (RAT) type once change of RAT is detected. At step 1104, the method 1100 allows the RIL based controller 224 to check whether the new RAT type set with MPTCP. If the RAT type is not set for MPTCP operation, at step 1106, the method 1100 allows the RIL based controller 224 to Use MPTCP backup mode. Further, the succeeding actions for the MPTCP are taken care by the MPTCP kernel 214. If the new RAT type is set for MPTCP, then at step 1106, the method 1100 allows the RIL based controller 224 to use fullmesh mode.

Thus, on detection of change in a RAT used by the client device 102, the MPTCP mode can be changed, during ongoing current data transport, depending on the type of RAT. For example, for "RAT TYPE==4G or Higher", interface mode 2 to 7 can be set, for "RAT TYPE==3G", interface mode 8 can be used and for "RAT TYPE==2G", interface mode 9 or interface mode 10 can be set.

For the SIOP operation, at step 1202, the method 1200 allows the RIL based controller 224 to check whether MPTCP running or enabled on the client device 102. If the MPTCP is enabled, at step 1204, the method 1200 allows the RIL based controller 224 to check whether level of SIOP is less than a SIOP threshold. If the SIOP level is less or MPTCP is not enabled or running, then at step 1206, the method 1200 allows the RIL based controller 224 to scale down CPU frequency. If the SIOP is greater than the SIOP threshold, then at step 1208, the method 1200 allows the RIL based controller 224 to control subflow Thus, if MPTCP is running, a check is made if the level is less than the threshold. If the level is less than the threshold, then the CPU frequency is scaled down. If the level is not less than the threshold, the MPTCP interface modes of operations are controlled appropriately. Threshold can be a value, which decides an interface mode can be dynamically changed or the controlling of the CPU of the device would be enough for this connection.

When level 1 of SIOP, the client device 102 can operate from interface mode 2 to 7. When level 2 of SIOP, the client device 102 can be operated at interface mode 3 and/or reduced CPU frequency. When level 3 or higher level of SIOP, the device may be operated at interface mode 9 or 10 and reduced CPU frequency.

Figure 13:
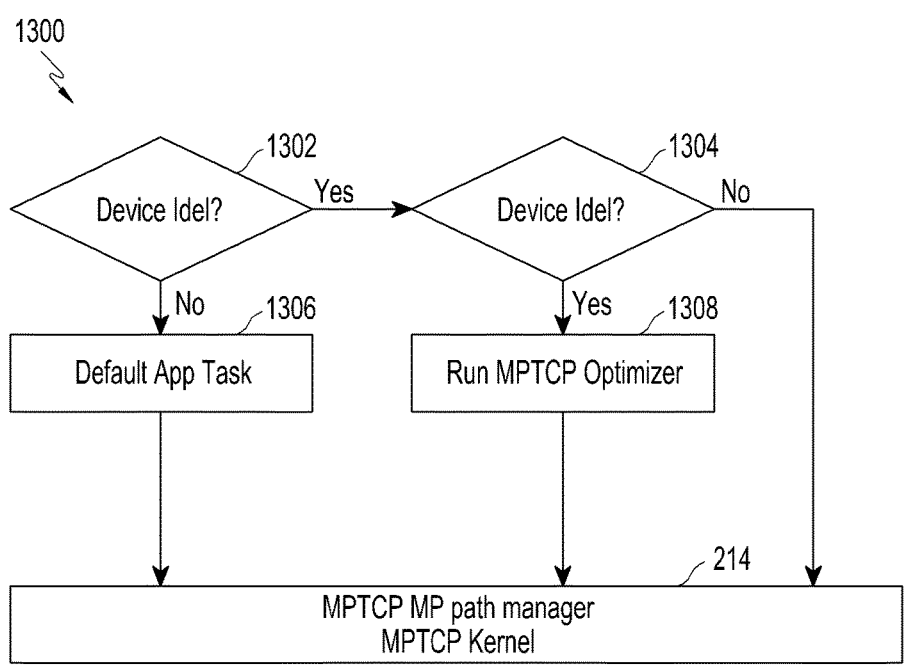
FIG. 13 illustrates the flow for controlling the KEEPALIVE connection, according to embodiments of the present disclosure.

FIG. 13 illustrates the flow for controlling the KEEPAL-IVE connection, according to embodiments of the present disclosure.

The main purpose of opening MPTCP connections sockets is to keep-alive the connection with the server and to sync up message. However, when multiple subflows are opened for same connection, there would be more power consumption. In the proposed method, we control the subflows according to the current device activity and also terminate the half closed subflows and hence save power in the android device. During the browsing/streaming, MPTCP is used only when needed. Idle time power optimization is effective by managing the MPTCP subflows. Less power consumption due to avoiding unnecessary socket creation and need basis adaptive implementation.

In an embodiment, when for device event corresponding to device state, at step 1302, the device idle state is detected as device event. At step 1304, once the device state is detected as idle state, the MPTCP optimizer unit 212 can be configured to control the interface mode of MPTCP operation based on the network interface status (UP and RUNNING) 1304. At step 1308, it can use interface mode 8 or interface mode 9 or interface mode 10 accordingly. However if device is in active state, at step 1306 the default application based MPTCP can be implemented.

Figure 14:
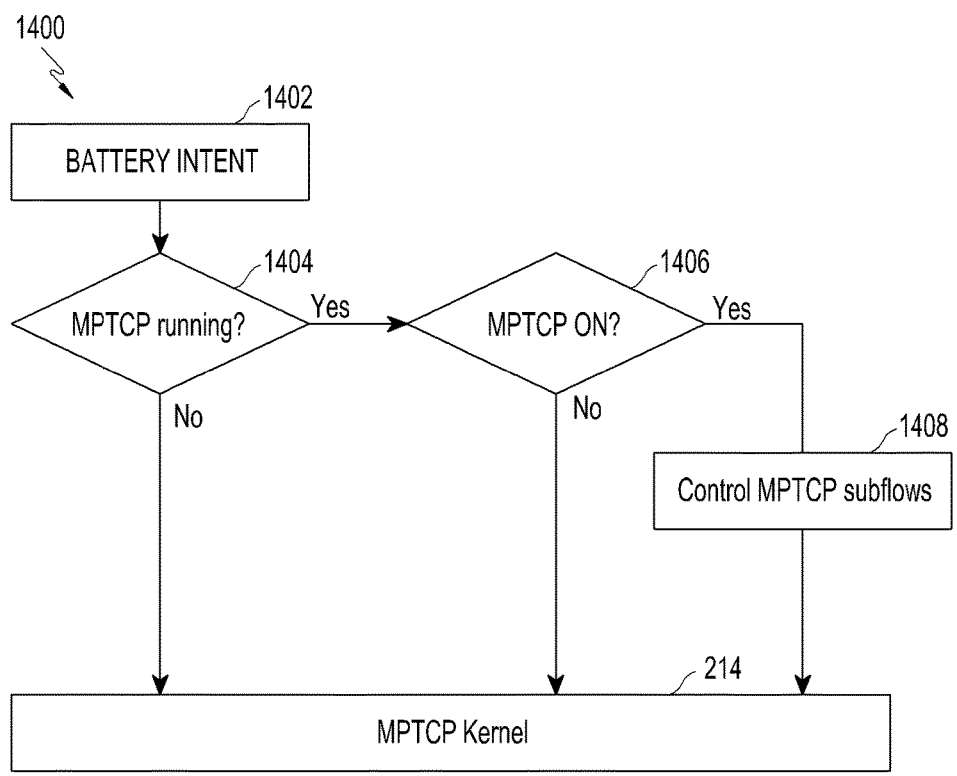
FIG. 14 illustrates the flow controlling MPTCP based on battery condition, according to embodiments of the present disclosure.

FIG. 14 illustrates the flow controlling MPTCP based on battery condition, according to embodiments of the present disclosure.

In an embodiment, at step 1402, MPTCP is managed on detection of device event such as battery condition. At step 1404, if the MPTCP is running or enabled for the client device 102, a check is made if battery level is less than the threshold at step 1406. The threshold can be a value, which decides the interface mode of MPTCP operation. If the battery level is less than the threshold, the client device 102 can initiate control of the subflows at step 1408. For example, at step 1408, when Battery level is less than 5% then interface mode 9 or 10 would be used to reduce power consumption. Extended battery life is guaranteed with better device performance and user experience is enhanced.

Figure 15:
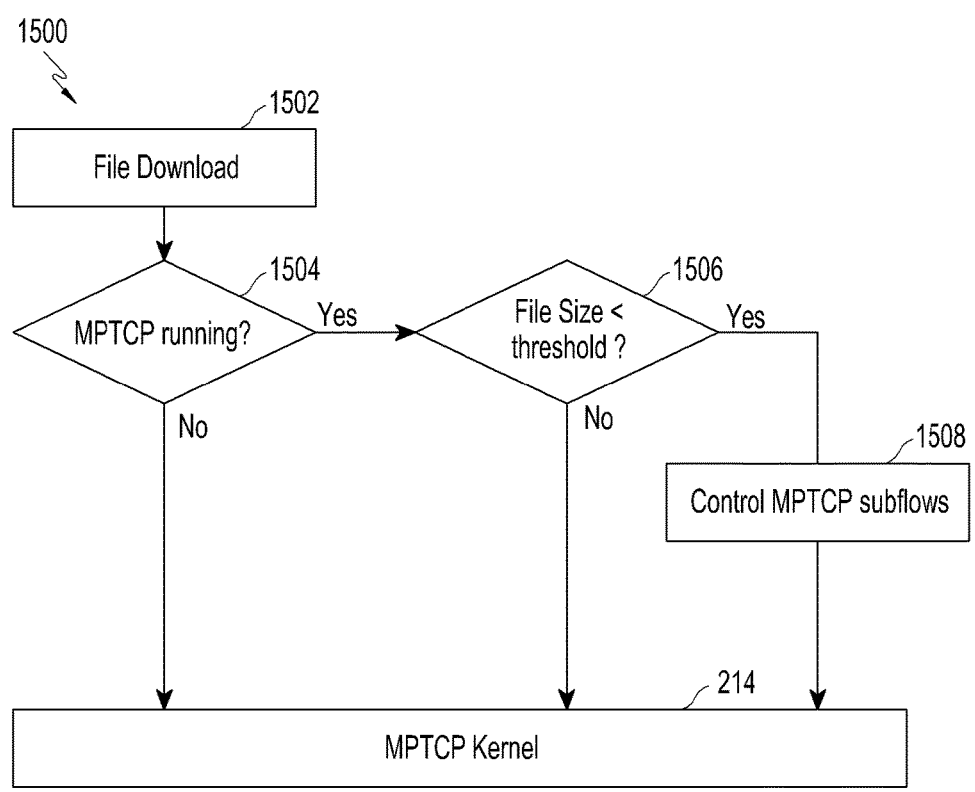
FIG. 15 illustrates the flow controlling MPTCP based on file download, according to embodiments of the present disclosure.

FIG. 15 illustrates the flow controlling MPTCP based on file download, according to embodiments of the present disclosure.

In an embodiment, at step 1502, subflow control for managing MPTCP on detection of file download event can be performed. At step 1504, if the MPTCP is running or enabled on the client device 102, a check is made if file size is less than the threshold at step 1506. The threshold can be a value, which decides the interface mode of MPTCP operation. If the file size is less than the threshold then interface mode 8 to 10 can be used and if the file size is greater or equal to the threshold value then interface mode 2 to 7 can be used accordingly at step 1508.

Figure 16:
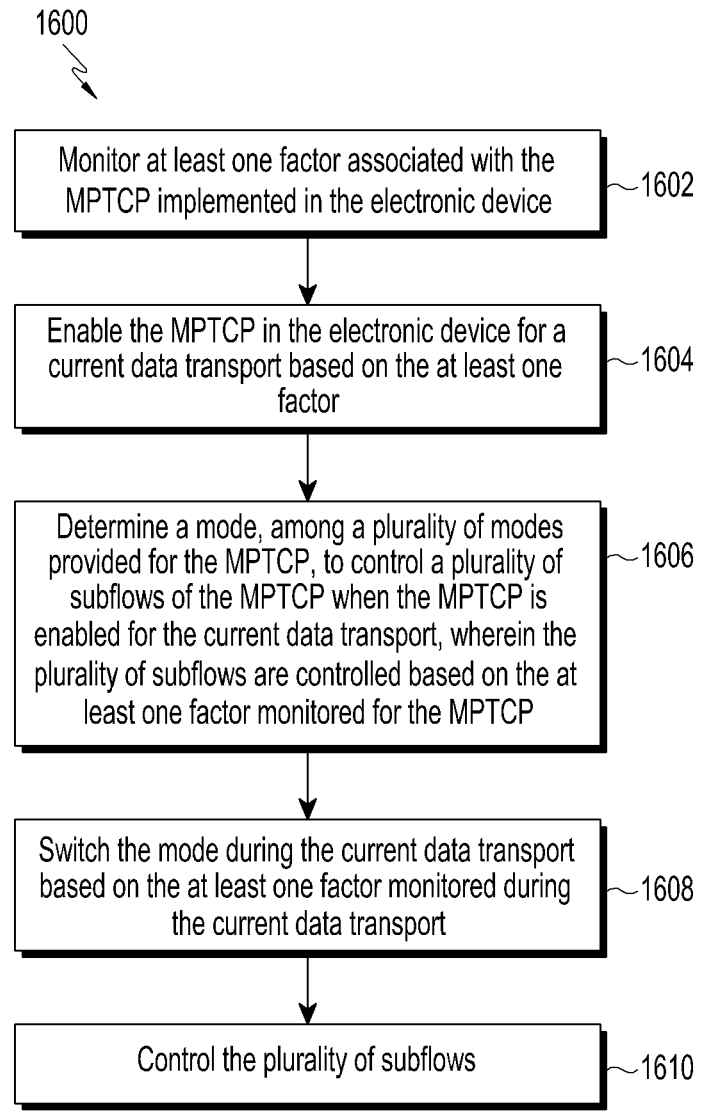
FIG. 16 illustrates a method for managing MPTCP to control a plurality of subflows of the MPTCP for data transport between the host device and the client device, according to embodiments of the present disclosure.

FIG. 16 illustrates a method for managing MPTCP to control a plurality of subflows of the MPTCP for data transport between the host device and the client device, according to embodiments of the present disclosure.

According to embodiments of the present disclosure, the method 1600 in a first device comprises: monitoring factors associated with the MPTCP; enabling the MPTCP; determining an interface mode, among a plurality of interface modes, to control a plurality of subflows of the MPTCP based on the factors; and switching from the interface mode to another interface mode during a current data transport based on the factors.

Additionally, the another interface mode may be switched based on power consumption and data consumption criteria. The factors may comprise at least two of user activity, device events, bandwidth requirement of the current data to be transported or a user setting corresponding to an application from a plurality of applications on the first device for which the current data transport is to be carried out. The user setting may be selectively applied for at least one application among the plurality of applications. Additionally, the first device communicates with a second device, and the first device includes first communication interfaces, and the second device includes second communication interfaces. Additionally, the plurality of interface modes comprise additional interface modes, wherein the additional interface modes dynamically enable multisession MPTCP subflows for at least one communication of the first communication interfaces. Moreover, the method 1600 may further comprises controlling the plurality of subflows based on priorities of the plurality of subflows, and wherein the first communication interfaces comprise at least one of a 3rd-generation (3G) communication interface, a 4th-generation (4G) communication interface, a long-term evolution (LTE) communication interface, a wired communication interface, a WI-FI® communication interface, a BLUETOOTH® communication interface or a near field communication (NFC) communication interface, and wherein the priorities of the plurality of subflows are determined based on the first communication interfaces. Moreover, the method 1600 further may comprises identifying priorities of the factors; and controlling the plurality of subflows based on the priorities of the factors, wherein the priorities of the factors are identified by the user setting including a priority related to the user activity, the device events and the bandwidth requirement of the current data to be transported. The interface mode may be defined according to a number of the first communication interfaces, a number of the second communication interfaces, multisession between the first device and the second device, and MPTCP modes. The multisession is obtained by creating at least two ports for one of the first communication interfaces. The MPTCP modes comprise an MPTCP on mode, an MPTCP off mode and an MPTCP backup mode. The MPTCP on mode is implemented to enable at least two of the first communication interfaces, the MPTCP off mode is implemented to enable one of the first communication interfaces and back up rest of the first communication interfaces, and the MPTCP backup mode is implemented to enable one of the first communication interfaces and disconnect or fallback rest of the first communication interfaces.

More specifically, at step 1602, the method 1600 allows the MPTCP optimizer unit 212 to monitor at least one factor associated with the MPTCP implemented in the client device 102. The at least one factor may comprise at least one of user activity of the user of the client device 102, device events detected by the client device 102, bandwidth requirement of the current data to be transported or user setting corresponding to an application from a plurality of applications on the electronic device (client device 102), for which the current data transport is to be carried out.

The user setting comprises the MPTCP on mode, the MPTCP off mode, the MPTCP backup mode and similar modes that can be selectively applied by the user for a particular application or a set comprising plurality of application grouped by the user.

Additionally, the user setting further comprises a priority related to the at least one of a WI-FI® subflow, a 3G subflow, a 4G subflow, a LTE subflow, a BLUETOOTH® subflow or near field communication subflow.

Additionally, user setting further comprises a priority related to user activity, device events, bandwidth requirement of the current data to be transported and a user setting corresponding to an application from a plurality of applications on the electronic device for which the current data transport is to be carried out.

Further, based on one or more factors that are monitored, at step 1604, the method 1600 allows the MPTCP optimizer unit 212 to determine whether to enable the MPTCP in the electronic device (client device 102) for the current data transport. Once the MPTCP is decided to be implemented, thereafter, at step 1606, the method 1600 allows the MPTCP optimizer unit 212 to determine an interface mode, among the plurality of interface modes provided for the MPTCP (as in FIGS. 3A to 3J) to control the plurality of subflows of the MPTCP. The method 400 provides additional interface modes (interface mode 6 and interface mode 7) as described in FIGS. 3F and 3G. The plurality of subflows are controlled based on one or more factors monitored for the MPTCP, wherein the interface mode determined for the current data transport is selected to provide optimized power consumption and data consumption. Additionally, the interface mode determined for the current data transport is selected to provide optimized power utilization in multipathing and multihoming conditions. For example, when MPTCP is on and when the device goes to idle state, then n*m (where n is the number of subflow and m is the current active application socket) number connections are opening in the android client to be linked with the server. Further, at step 1608, the method 1600 allows the MPTCP optimizer unit 212 to dynamically switch the interface mode of the MPTCP during the current data transport based on the one or more factors being monitored during the current data transport so as to achieve adaptive power consumption and data consumption. The control of the subflows using various user setting and the plurality of interface modes of MPTCP in accordance with the various modules of the MPTCP optimizer unit 212 are explained in conjunction with FIG. 5 through FIG. 15. Further, at step 1610, the method 1600 allows the MPTCP optimizer unit 212 to control the plurality of subflows. The MPTCP optimizer 212 is further configured to control the plurality of subflows according to priorities of the plurality of subflows, wherein the plurality of subflows comprises at least one of a WI-FI® subflow, a 3G subflow, a 4G subflow, a LTE subflow, a BLUETOOTH® subflow or near field communication subflow, and wherein the priorities of the plurality of subflows are determined by a user setting including a priority of related to the at least one of a WI-FI® subflow, a 3G subflow, a 4G subflow, a LTE subflow, a BLUETOOTH® subflow or near field communication subflow. Additionally, the MPTCP optimizer 212 is further configured to identify priorities of the at least one factor. Additionally, the MPTCP optimizer 212 is further configured to control the plurality of subflows according to priorities of the at least one factor, wherein the priorities of the at least one factor are determined by a user setting including a priority related to user activity, device events, bandwidth requirement of the current data to be transported and a user setting corresponding to an application from a plurality of applications on the electronic device for which the current data transport is to be carried out.

Additionally, the interface mode may be identified based on fullmesh path of the electronic device, Ndiffports path of the at least one communication interface and MPTCP mode.

Additionally, the fullmesh path of the electronic device may be configured to be created by at least two communication interface.

Additionally, the Ndiffports path of the at least one communication interface may be created by at least two ports of one of the at least one communication interface.

Additionally, the MPTCP mode may comprise MPTCP on mode, MPTCP off mode, MPTCP backup mode.

Additionally, the MPTCP on mode may be implemented by selecting the fullmesh path and/or the Ndiffports path.

Additionally, the MPTCP off mode may be implemented by using just one communication interface such as WI-FI®.

Additionally, the MPTCP backup is implemented when one interface in the client device 102 is set as default and another is set as backup communication interface.

The dynamic control aspect is better explained below with an example. When an application such as a video application (for example, YOUTUBE®), which is operating in fullmesh mode utilizes both LTE and WI-FI® even if WI-FI® speed is enough for the video streaming. By dynamic control, the method proposed checks if WI-FI® speed is enough for the current video to stream. If WI-FI® speed is enough for the current video to stream, the interface mode is automatically switched to using WI-FI® only during the current data being transported (video being streamed). However, if WI-FI® is unable to provide the desired speed for data, the method 1600 enables switching back to fullmesh mode or Ndiff fullmesh mode.

The various actions in method 1600 may be performed in the order presented, in a different order or simultaneously. Further, in some embodiments, some actions listed in FIG. 16 may be omitted.

Figure 17:
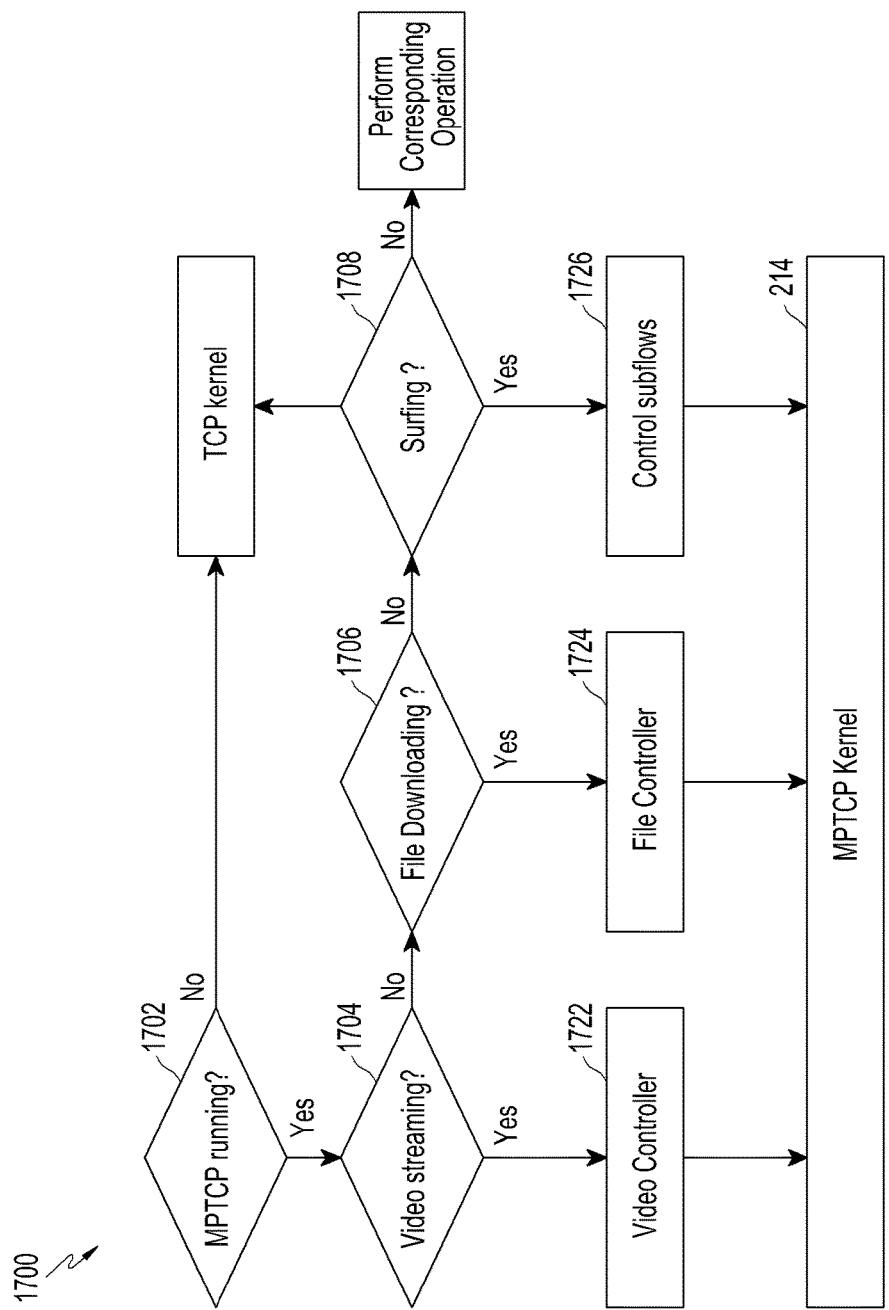
FIG. 17 illustrates the flow controlling MPTCP based on a user activity, according to embodiments of the present disclosure.

FIG. 17 illustrates the flow controlling MPTCP based on a user activity, according to embodiments of the present disclosure.

The user activity comprises at least one of a video streaming, a file downloading or a surfing, wherein the video streaming can be controlled by video controller 216, the file downloading can be controlled by file controller and the surfing can be controlled by MPTCP controller 212.

In an embodiment, at step 1702, if the MPTCP is running or enabled on the client device 102, a check is made if a user activity is identified as a video streaming at step 1704. At step 1722, the video streaming can be controlled by video controller 216. At step 1722, the video controller 216 will be called which would take care of optimizing power and data by managing the available interfaces. If a user activity is not identified as a video streaming, a check is made if a user activity is identified as a file downloading at step 1706. At step 1724, the file downloading can be controlled by file controller. At step 1724, the file controller will optimize the subflows. If a user activity is not identified as a file downloading, a check is made if a user activity is identified as a surfing (1708). At step 1726, the surfing can be controlled by MPTCP controller 212. At step 1726, there is no need to make use of additional interfaces and hence subflows can be controlled.

Figure 18:
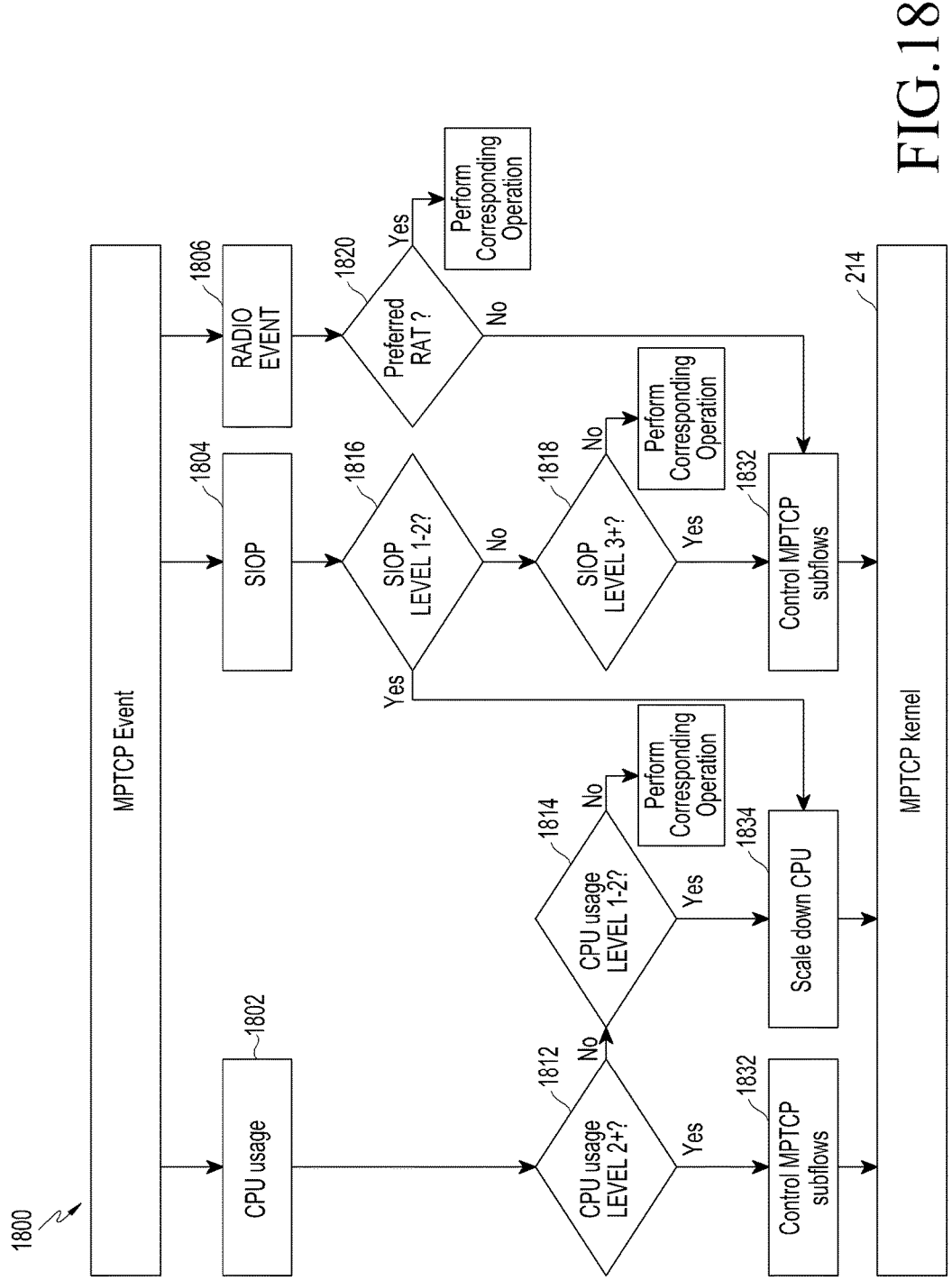
FIG. 18 illustrates the flow controlling MPTCP based on a device event, according to embodiments of the present disclosure.

FIG. 18 illustrates the flow controlling MPTCP based on a device event, according to embodiments of the present disclosure.

The device event comprises at least one of a CPU usage level, a serial (SIOP) level or a RADIO event.

In an embodiment, at step 1802, the CPU usage is detected as device event. If the CPU usage is more than level 2 at step 1812, MPTCP controller 212 can control MPTCP subflows at step 1832. If the CPU usage is more than level 1 but less than level 2 (1814), then CPU frequency is scaled down at step 1834. As CPU frequency is scaled down, an electric device can consume less power. For example, if the CPU usage is more than 10% but less than 15%, then CPU frequency is scaled down. If CPU usage is more than 15%, the MPTCP controller 212 can control MPTCP subflows and distribute MPTCP subflows.

At step 1804, the SIOP level is detected as device event. If the SIOP level is between 1 and 2 (1816), then the CPU frequency is scaled down at step 1834. If the SIOP level is 3 or more (1818), then the MPTCP controller 212 can control MPTCP subflows.

At step 1806, the RAT type is detected as a RADIO event, one of device event. When the RAT type is not preferred one (1820), then the MPTCP controller 212 can control MPTCP subflows.

Figure 19:
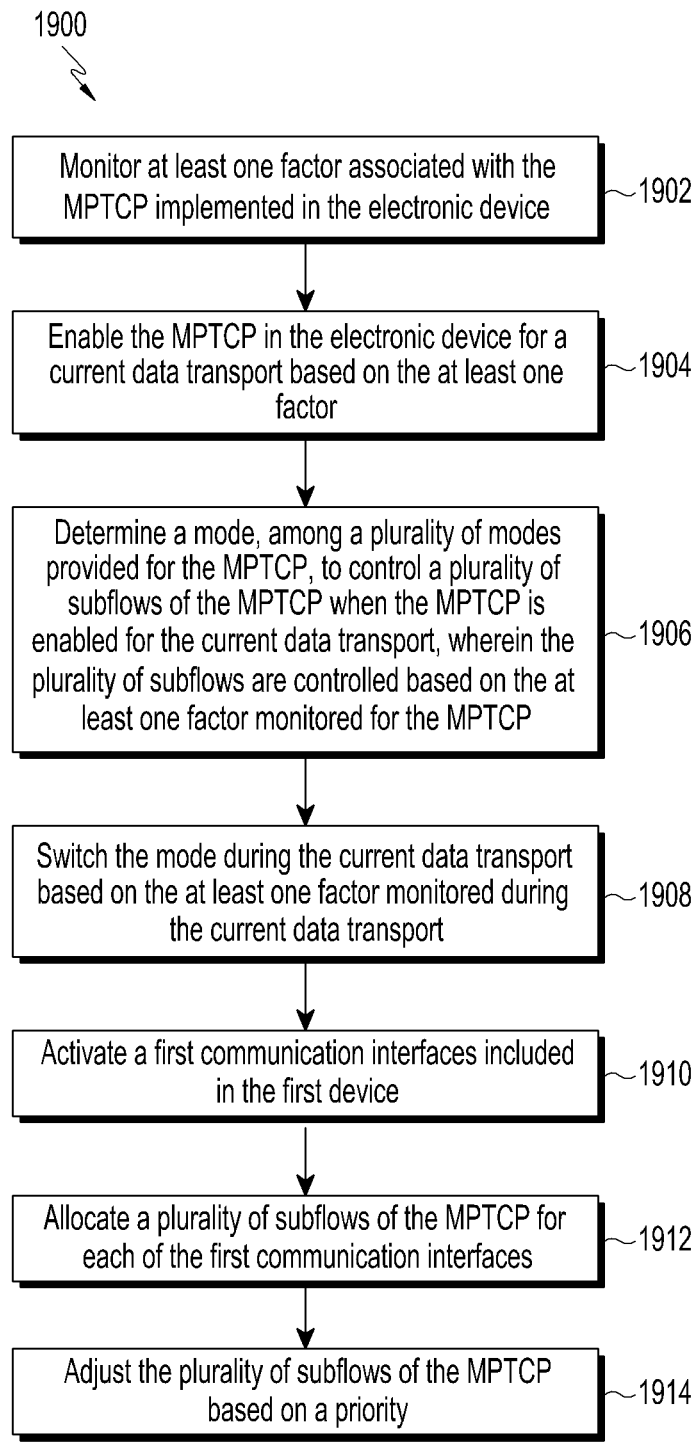
FIG. 19 illustrates a method for managing MPTCP to control a plurality of subflows of the MPTCP for data transport between the host device and the client device, according to embodiments of the present disclosure.

FIG. 19 illustrates a method for managing MPTCP to control a plurality of subflows of the MPTCP for data transport between the host device and the client device, according to embodiments of the present disclosure.

According to embodiments of the present disclosure, the method 1900 in a first device comprises: monitoring factors associated with the MPTCP; enabling the MPTCP; determining an interface mode, among a plurality of interface modes, to control a plurality of subflows of the MPTCP based on the factors; and switching from the interface mode to another interface mode during a current data transport based on the factors.

Additionally, the another interface mode may be switched based on power consumption and data consumption criteria. The factors may comprise at least two of user activity, device events, bandwidth requirement of the current data to be transported or a user setting corresponding to an application from a plurality of applications on the first device for which the current data transport is to be carried out. The user setting may be selectively applied for at least one application among the plurality of applications. Additionally, the first device communicates with a second device, and the first device includes first communication interfaces, and the second device includes second communication interfaces. Additionally, the plurality of interface modes comprise additional interface modes, wherein the additional interface modes dynamically enable multisession MPTCP subflows for at least one communication of the first communication interfaces. Moreover, the method 1900 may further comprises controlling the plurality of subflows based on priorities of the plurality of subflows, and wherein the first communication interfaces comprise at least one of a 3rd-generation (3G) communication interface, a 4th-generation (4G) communication interface, a long-term evolution (LTE) communication interface, a wired communication interface, a WI-FI® communication interface, a BLUETOOTH® communication interface or a near field communication (NFC) communication interface, and wherein the priorities of the plurality of subflows are determined based on the first communication interfaces. Moreover, the method 1900 further may comprises identifying priorities of the factors; and controlling the plurality of subflows based on the priorities of the factors, wherein the priorities of the factors are identified by the user setting including a priority related to the user activity, the device events and the bandwidth requirement of the current data to be transported. The interface mode may be defined according to a number of the first communication interfaces, a number of the second communication interfaces, multisession between the first device and the second device, and MPTCP modes. The multisession is obtained by creating at least two ports for one of the first communication interfaces. The MPTCP modes comprise an MPTCP on mode, an MPTCP off mode and an MPTCP backup mode. The MPTCP on mode is implemented to enable at least two of the first communication interfaces, the MPTCP off mode is implemented to enable one of the first communication interfaces and back up rest of the first communication interfaces, and the MPTCP backup mode is implemented to enable one of the first communication interfaces and disconnect or fallback rest of the first communication interfaces.

More specifically, at step 1902, the method 1900 allows the MPTCP optimizer unit 212 to monitor at least one factor associated with the MPTCP implemented in the client device 102. The at least one factor may comprise at least one of user activity of the user of the client device 102, device events detected by the client device 102, bandwidth requirement of the current data to be transported or user setting corresponding to an application from a plurality of applications on the electronic device (client device 102), for which the current data transport is to be carried out.

The user setting comprises the MPTCP on mode, the MPTCP off mode, the MPTCP backup mode and similar modes that can be selectively applied by the user for a particular application or a set comprising plurality of application grouped by the user.

Additionally, the user setting further comprises a priority related to the at least one of a WI-FI® subflow, a 3G subflow, a 4G subflow, a LTE subflow, a BLUETOOTH® subflow or near field communication subflow.

Additionally, user setting further comprises a priority related to user activity, device events, bandwidth requirement of the current data to be transported and a user setting corresponding to an application from a plurality of applications on the electronic device for which the current data transport is to be carried out.

Further, based on one or more factors that are monitored, at step 1904, the method 1900 allows the MPTCP optimizer unit 212 to determine whether to enable the MPTCP in the electronic device (client device 102) for the current data transport. Once the MPTCP is decided to be implemented, thereafter, at step 1906, the method 1900 allows the MPTCP optimizer unit 212 to determine an interface mode, among the plurality of interface modes provided for the MPTCP (as in FIGS. 3A to 3J) to control the plurality of subflows of the MPTCP. The method 400 provides additional interface modes (interface mode 6 and interface mode 7) as described in FIGS. 3F and 3G. The plurality of subflows are controlled based on one or more factors monitored for the MPTCP, wherein the interface mode determined for the current data transport is selected to provide optimized power consumption and data consumption. Additionally, the interface mode determined for the current data transport is selected to provide optimized power utilization in multipathing and multihoming conditions. For example, when MPTCP is on and when the device goes to idle state, then n*m (where n is the number of subflow and m is the current active application socket) number connections are opening in the android client to be linked with the server. Further, at step 1908, the method 1900 allows the MPTCP optimizer unit 212 to dynamically switch the interface mode of the MPTCP during the current data transport based on the one or more factors being monitored during the current data transport so as to achieve adaptive power consumption and data consumption. The control of the subflows using various user setting and the plurality of interface modes of MPTCP in accordance with the various modules of the MPTCP optimizer unit 212 are explained in conjunction with FIG. 5 through FIG. 15. Further, at step 1910, the method 1900 allows the MPTCP optimizer unit 212 to activate, based on the another interface mode switched, a first communication interfaces included in the first device. The MPTCP optimizer unit (MPTCP controller) 212 may activate at least one communication interface included in the first communication interfaces. The MPTCP controller 212 may activate the at least one communication interface based on the network conditions or operational conditions. Network conditions may comprise bandwidth requirement or estimation of bandwidth requirement related to the at least one communication interface. Network conditions may comprise the path characteristics such as the loss, delay, jitter and quality of service related to the at least one communication interface. The operational condition may comprise at least one of following: a user interest, a user priority, a social layer information, UE operational conditions and other dynamic changing operations. The UE operational conditions may include battery condition, temperature of CPU, CPU usage and other UE parameters. The other dynamic changing operations may include a location and time. Further at step 1912, the method 1900 allows the MPTCP optimizer unit 212 to allocate a plurality of subflows of the MPTCP for at least one communication interface of the first plurality of communication interfaces based on the at least one factor. Further, at step 1914, the method 1900 allows the MPTCP optimizer unit 212 to adjust the plurality of subflows of the MPTCP based on a priority regarding to the first communication interfaces including at least one of a 3rd-generation (3G) communication interface, a 4th-generation (4G) communication interface, a long-term evolution (LTE) communication interface, a wired communication interface, a wireless fidelity (Wi-Fi) communication interface, a bluetooth communication interface or a near field communication (NFC) communication interface. The MPTCP controller 212 may adjust the plurality of subflows of the MPTCP based on a priority of the network conditions or operational conditions. Network conditions may comprise bandwidth requirement or estimation of bandwidth requirement related to the at least one communication interface. Network conditions may comprise the path characteristics such as the loss, delay, jitter and quality of service related to the at least one communication interface. The operational condition may comprise at least one of following: a user interest, a user priority, a social layer information, UE operational conditions and other dynamic changing operations. The UE operational conditions may include battery condition, temperature of CPU, CPU usage and other UE parameters. The other dynamic changing operations may include a location and time. Adjusting the plurality of subflows of the MPTCP, comprises increasing or reducing a number of the plurality of subflows of the MPTCP for the at least one communication interface. In addition, MPTCP controller 212 may increase or reduce a number of the plurality of subflows of the MPTCP for the at least one communication based on the network conditions and the operational conditions.

The embodiments disclosed herein can be implemented through at least one software program running on at least one hardware device and performing network management functions to control the network elements. The network elements shown in FIG. 1 through FIG. 16 include blocks which can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

Certain aspects of the present disclosure may also be embodied as computer readable code on a non-transitory computer readable recording medium. A non-transitory computer readable recording medium is any data storage device that can store data, which can be thereafter read by a computer system. Examples of the non-transitory computer readable recording medium include read only memory (ROM), random access memory (RAM), CD-ROMs, magnetic tapes, floppy disks, optical data storage devices, and carrier waves (such as data transmission through the Internet). The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

It can be appreciated that a method and apparatus according to an embodiment of the present disclosure may be implemented by hardware, software and/or a combination thereof. The software may be stored in a non-volatile storage, for example, an erasable or re-writable ROM, a memory, for example, a RAM, a memory chip, a memory device, or a memory integrated circuit (IC), or an optically or magnetically recordable non-transitory machine-readable (e.g., computer-readable), storage medium (e.g., a compact disk (CD), a digital versatile disk (DVD), a magnetic disk, a magnetic tape, and/or the like). A method and apparatus according to an embodiment of the present disclosure may be implemented by a computer or a mobile terminal that includes a controller and a memory, and the memory may be an example of a non-transitory machine-readable (e.g., computer-readable), storage medium suitable to store a program or programs including instructions for implementing various embodiments of the present disclosure.

The present disclosure may include a program including code for implementing the apparatus and method as defined by the appended claims, and a non-transitory machine-readable (e.g., computer-readable), storage medium storing the program. The program may be electronically transferred via any media, such as communication signals, which are transmitted through wired and/or wireless connections, and the present disclosure may include their equivalents.

An apparatus according to an embodiment of the present disclosure may receive the program from a program providing device which is connected to the apparatus via a wire or a wireless and store the program. The program providing device may include a memory for storing instructions which instruct to perform a content protect method which has been already installed, information necessary for the content protect method, and the like, a communication unit for performing a wired or a wireless communication with a graphic processing device, and a controller for transmitting a related program to a transmitting/receiving device based on a request of the graphic processing device or automatically transmitting the related program to the transmitting/receiving device.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for managing a multipath transmission control protocol (MPTCP) in a first device communicating with a second device, the method comprising:
    monitoring at least one factor associated with the MPTCP having a plurality of subflows;
    enabling the MPTCP based on the at least one factor;
    obtaining a CPU usage level or a serial input output port (SIOP) level of the first device; and
    controlling the plurality of subflows of the MPTCP when the CPU usage level is higher than a predetermined CPU level or when the SIOP level is higher than a predetermined SIOP level,
    wherein the at least one factor comprises at least one of user activity, a device event, bandwidth requirement of a current data to be transported, or a user setting corresponding to an application from a plurality of applications on the first device for which a current data transport is to be carried out.

2. The method of claim 1, further comprising:
    activating, based on an interface mode, at least one communication interface from a first plurality of communication interfaces included in the first device;
    allocating the plurality of subflows of the MPTCP for the at least one communication interface based on the at least one factor; and
    adjusting the plurality of subflows of the MPTCP based on the at least one factor.

3. The method of claim 2, wherein the at least one factor comprises at least two of the user activity, the device event, the bandwidth requirement of the current data to be transported, or the user setting corresponding to the application from the plurality of applications on the first device for which the current data transport is to be carried out.

4. The method of claim 3, further comprising:
    increasing a number of the plurality of subflows for the at least one communication interface when the bandwidth requirement of the at least one communication interface is less than a first level; and
    reducing the number of the plurality of subflows for the at least one communication interface when the bandwidth requirement of the at least one communication interface is equal to or more than a second level,
    wherein the second level is higher than the first level.

5. The method of claim 3, wherein the user setting corresponding to the application from the plurality of applications is selectively applied the application from the plurality of applications.

6. The method of claim 1, wherein a plurality of interface modes comprise additional interface modes, wherein the additional interface modes dynamically enable multisession MPTCP subflows for at least one communication interface.

7. The method of claim 1, further comprising:
    identifying whether a radio event occurs;
    obtaining a radio access technology (RAT) type; and
    controlling the plurality of subflows of the MPTCP when the RAT type is not a preferred RAT.

8. The method of claim 3, further comprising:
    identifying at least one priority of the at least one factor; and
    controlling the plurality of subflows based on the at least one priority of the at least one factor,
    wherein the at least one priority of the at least one factor is identified by the user setting including a priority related to the user activity, the device event, and the bandwidth requirement of the current data to be transported.

9. A first device, communicating with a second device, for managing a multipath transmission control protocol (MPTCP), wherein the first device comprises a MPTCP controller configured to:
    monitor at least one factor associated with the MPTCP having a plurality of subflows,
    enable the MPTCP based on the at least one factor,
    determine at least one of a number of the plurality of subflows of the MPTCP or an interface mode to optimize a performance characteristic of the first device, among a plurality of interface modes based on the at least one factor,
    obtain a CPU usage level or a serial input output port (SIOP) level of the first device, and
    control the plurality of subflows of the MPTCP when the CPU usage level is higher than a predetermined CPU level or when the SIOP level is higher than a predetermined SIOP level,
    wherein the at least one factor comprises at least one of user activity, a device event, bandwidth requirement of a current data to be transported, or a user setting corresponding to an application from a plurality of applications on the first device for which a current data transport is to be carried out.

10. The first device of claim 9, wherein the MPTCP controller is further configured to:
activate, based on the interface mode switched, at least one communication interface from a first plurality of communication interfaces included in the first device,
allocate the plurality of subflows of the MPTCP for the at least one communication interface based on the at least one factor, and
adjust the plurality of subflows of the MPTCP based on the at least one factor.

11. The first device of claim 10, wherein the at least one factor comprises at least two of the user activity, the device event, the bandwidth requirement of the current data to be transported, or the user setting corresponding to an application from the plurality of applications on the first device for which the current data transport is to be carried out.

12. The first device of claim 11, wherein the MPTCP controller is further configured to:
increase the number of the plurality of subflows for the at least one communication interface when the bandwidth requirement of the at least one communication interface is less than a first level, and
reduce the number of the plurality of subflows for the at least one communication interface when the bandwidth requirement of the at least one communication interface is equal to or more than a second level,
wherein the second level is higher than the first level.

13. The first device of claim 11, wherein the user setting corresponding to the application from the plurality of applications is selectively applied for the application from the plurality of applications.

14. The first device of claim 9, wherein the plurality of interface modes comprises additional interface modes, wherein the additional interface modes dynamically enable multisession MPTCP subflows for at least one communication interface.

15. The first device of claim 9, wherein the MPTCP controller is further configured to:
identify whether a radio event occurs,
obtain a radio access technology (RAT) type, and
control the plurality of subflows of the MPTCP when the RAT type is not a preferred RAT.

16. The first device of claim 11, wherein the MPTCP controller further configured to:
identify priority of the at least one factor, and
control the plurality of subflows based on the priority of the at least one factor,
wherein the priority of the at least one factor is identified by the user setting including a priority related to the user activity, the device event and the bandwidth requirement of the current data to be transported.

17. The first device of claim 9, wherein a multisession between the first device and the second device is obtained by creating at least two ports for one of a first plurality of communication interfaces.

18. The first device of claim 9, wherein the MPTCP modes comprise an MPTCP on mode, an MPTCP off mode, and an MPTCP backup mode,
wherein the MPTCP on mode is implemented to enable at least two communication interfaces, the MPTCP backup mode is implemented to enable one of a first plurality of communication interfaces and back up rest of the first plurality of communication interfaces, and the MPTCP off mode is implemented to enable one of the first plurality of communication interfaces and disconnect or fallback rest of the first plurality of communication interfaces.

* * * * *